United States Patent
Mathew et al.

(10) Patent No.: US 10,466,967 B2
(45) Date of Patent: Nov. 5, 2019

(54) SYSTEM AND METHOD FOR PIECEWISE LINEAR APPROXIMATION

(71) Applicant: QUALCOMM Incorporated, San Diego, CA (US)

(72) Inventors: Deepak Mathew, Acton, MA (US); Ajay Anant Ingle, Austin, TX (US); Yurong Sun, Acton, MA (US); Jianming Zhu, Acton, MA (US); Marc Hoffman, Mansfield, MA (US)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 15/224,237

(22) Filed: Jul. 29, 2016

(65) Prior Publication Data
US 2018/0032311 A1 Feb. 1, 2018

(51) Int. Cl.
*G06F 7/483* (2006.01)
*G06F 17/17* (2006.01)
(Continued)

(52) U.S. Cl.
CPC ............... *G06F 7/483* (2013.01); *G06F 1/03* (2013.01); *G06F 7/544* (2013.01);
(Continued)

(58) Field of Classification Search
CPC .. G06F 9/30036; G06F 15/8053; G06F 17/17; G06F 1/03–0307; G06F 7/544; G06F 7/548–556
See application file for complete search history.

(56) References Cited

U.S. PATENT DOCUMENTS

| 7,593,851 B2 | 9/2009 | Yang |
| 8,416,719 B2 | 4/2013 | Dabiri |

(Continued)

FOREIGN PATENT DOCUMENTS

| EP | 0387008 A2 | 9/1990 |
| WO | 2005116862 A2 | 12/2005 |
| WO | 2017003695 A1 | 1/2017 |

OTHER PUBLICATIONS

International Search Report and Written Opinion—PCT/US2017/035803—ISA/EPO—dated Apr. 5, 2018, 12 pages.

(Continued)

*Primary Examiner* — Matthew D Sandifer
(74) *Attorney, Agent, or Firm* — Qualcomm Incorporated-Toler

(57) ABSTRACT

An apparatus includes one or more registers configured to store a vector of input values. The apparatus also includes a coefficient determination unit configured to, responsive to execution by a processor of a single instruction, select a plurality of piecewise analysis coefficients. The plurality of piecewise analysis coefficients includes one or more sets of piecewise analysis coefficients, and each set of piecewise analysis coefficients corresponds to an input value of the vector of input values. The apparatus further includes arithmetic logic circuitry configured to, responsive to the execution of at least the single instruction, determine estimated output values of a function based on the plurality of piecewise analysis coefficients and the vector of input values.

30 Claims, 9 Drawing Sheets

(51) Int. Cl.
G06F 9/30 (2018.01)
G06F 7/544 (2006.01)
G06F 1/03 (2006.01)
G06F 7/548 (2006.01)

(52) U.S. Cl.
CPC .......... *G06F 9/30036* (2013.01); *G06F 17/17* (2013.01); *G06F 7/548* (2013.01)

(56) References Cited

U.S. PATENT DOCUMENTS

| | | | |
|---|---|---|---|
| 8,793,560 | B2 | 7/2014 | Sidi et al. |
| 2004/0051713 | A1* | 3/2004 | Clyde Fossum ........ G06F 17/17 345/440 |
| 2005/0114134 | A1 | 5/2005 | Deng et al. |
| 2015/0052330 | A1 | 2/2015 | Ingle et al. |
| 2016/0054995 | A1 | 2/2016 | Dehner et al. |
| 2017/0003966 | A1* | 1/2017 | Haraden ............. G06F 9/30145 |
| 2017/0286106 | A1* | 10/2017 | Ben-Dayan Rubin ........................ G06F 9/3001 |

OTHER PUBLICATIONS

De Caro D., et al., "High-Performance Direct Digital Frequency Synthesizers Using Piecewise-Polynomial Approximation," IEEE Transactions on Circuits and Systems-I: Regular Papers, Feb. 2005, vol. 52 (2), pp. 324-337.

* cited by examiner

SYSTEM AND METHOD FOR PIECEWISE LINEAR APPROXIMATION

I. FIELD

The present disclosure is generally related to piecewise linear approximation using a vector of input values.

II. DESCRIPTION OF RELATED ART

Advances in technology have resulted in smaller and more powerful computing devices. For example, there currently exist a variety of portable personal computing devices, including wireless telephones such as mobile and smart phones, tablets, and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

To enable advanced computing capabilities, certain functions (e.g., mathematical computations, such as an inverse function, a square root function, an inverse square root function, an exponential function, a logarithmic function, a trigonometric function etc.) may be approximated by a processor in order to reduce computational time and to increase computational efficiency. For example, a particular function may be approximated by generating Taylor expansions that are based on multiple order polynomials. However, using Taylor expansions generated from multiple order polynomials to approximate a function may use a relatively large number of instructions. Executing and processing the large number of instructions may use significant computational resources, such as a relatively large number of processing cycles, a relatively large amount of memory storage space, a significant number of execution units, or a combination thereof.

III. SUMMARY

In a particular aspect, an apparatus includes one or more registers configured to store a vector of input values. The apparatus also includes a coefficient determination unit configured to, responsive to execution by a processor of a single instruction, select a plurality of piecewise analysis coefficients. The plurality of piecewise analysis coefficients includes one or more sets of piecewise analysis coefficients, and each set of piecewise analysis coefficients corresponds to an input value of the vector of input values. The apparatus further includes arithmetic logic circuitry configured to, responsive to the execution of at least the single instruction, determine estimated output values of a function based on the plurality of piecewise analysis coefficients and the vector of input values.

In another particular aspect, a method includes receiving a vector of input values. The method also includes executing a single instruction to select a plurality of piecewise analysis coefficients. The plurality of piecewise analysis coefficients includes one or more sets of piecewise analysis coefficients, and each set of piecewise analysis coefficients corresponds to an input value of the vector of input values. The method further includes determining estimated output values of a function based on the plurality of piecewise analysis coefficients and the vector of input values.

In another particular aspect, an apparatus includes means for receiving a vector of input values. The apparatus also includes means for executing a single instruction to select a plurality of piecewise analysis coefficients. The plurality of piecewise analysis coefficients includes one or more sets of piecewise analysis coefficients, and each set of piecewise analysis coefficients corresponds to an input value of the vector of input values. The apparatus further includes means for determining estimated output values of a function based on the plurality of piecewise analysis coefficients and the vector of input values.

In another particular aspect, a non-transitory computer-readable medium comprises at least a single instruction that, when executed by a processor, causes the processor to select a plurality of piecewise analysis coefficients based on a vector of input values. The plurality of piecewise analysis coefficients includes one or more sets of piecewise analysis coefficients, and each set of piecewise analysis coefficients corresponds to an input value of the vector of input values. The at least a single instruction causes the processor to generate a vector of piecewise analysis coefficients based on the selected plurality of piecewise analysis coefficients.

Other aspects, advantages, and features of the present disclosure will become apparent after review of the application, including the following sections: Brief Description of the Drawings, Detailed Description, and the Claims.

IV. BRIEF DESCRIPTION OF THE DRAWINGS

V. DETAILED DESCRIPTION

Figure 1:
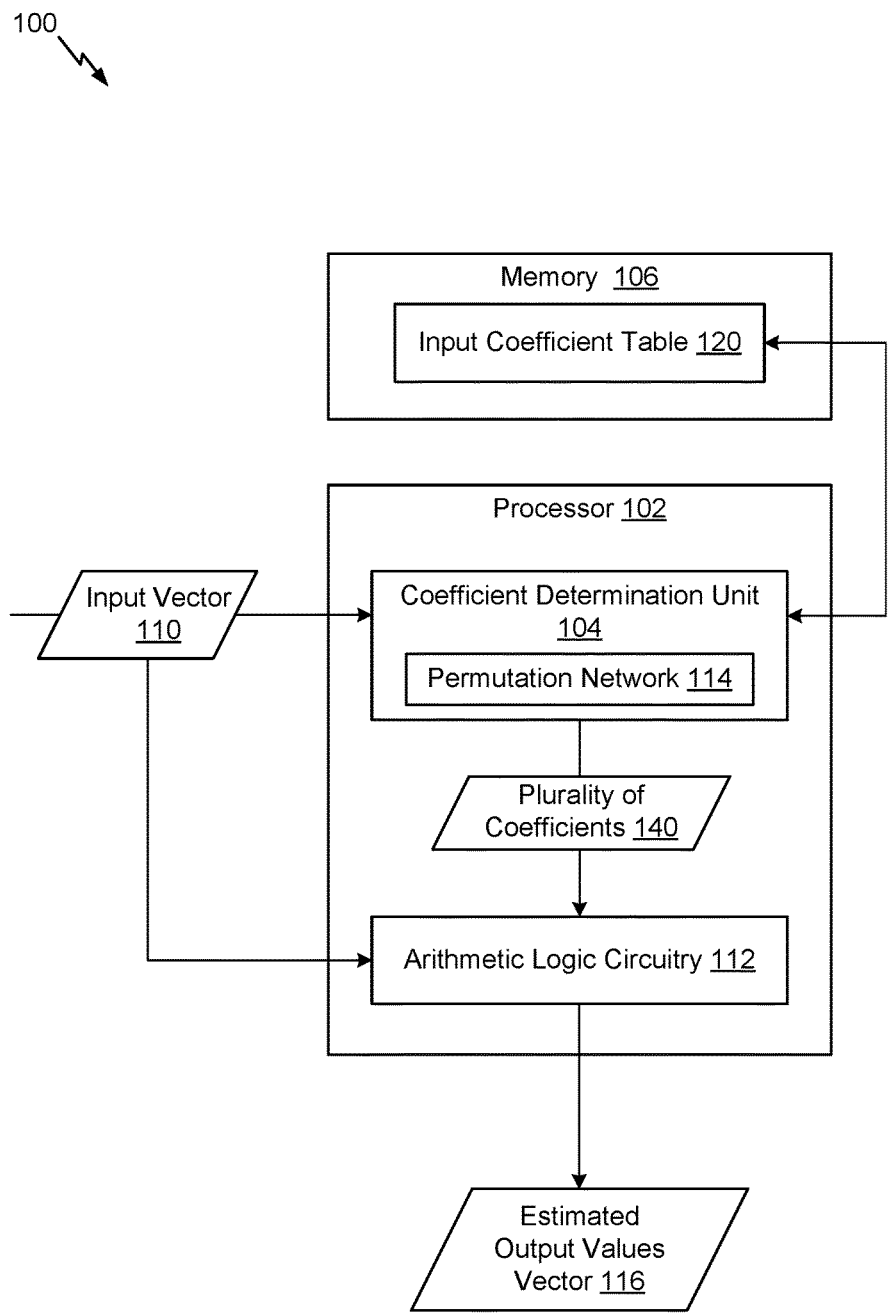
FIG. 1 is a block diagram of an example of a system for using piecewise analysis to generate estimated values of a function.

Particular implementations of the present disclosure are described below with reference to the drawings. In the description, common features are designated by common reference numbers throughout the drawings. As used herein, various terminology is for the purpose of describing particular implementations only and is not intended to be limiting of implementations. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where."

As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "storage medium," as used herein, is not to be construed as consisting solely of transient signals per se, such as radio waves. As used herein, the term "set" refers to one or more of a particular element, and the term "plurality" refers to multiple (e.g., two or more) of a particular element.

The present disclosure describes estimating output values of a function using piecewise linear approximation by executing a reduced number of instructions (e.g., one or two instructions). For example, a processor may receive a vector of input values (corresponding to input values of the function) and may select a plurality of piecewise analysis coefficients. In some implementations, the processor may generate a vector of piecewise analysis coefficients that includes the plurality of piecewise analysis coefficients. In a particular implementation, the function may be non-linear, and the piecewise analysis coefficients may be based on a first order Taylor expansion (e.g., a linear approximation) of the non-linear function. The plurality of piecewise analysis coefficients may be selected from a table that includes multiple piecewise analysis coefficients. A permutation network may be used by the processor to select the plurality of piecewise analysis coefficients (or to generate the vector of piecewise analysis coefficients) based on the vector of input values and the table. To illustrate, the permutation network may be used to select and route one or more of the multiple piecewise analysis coefficients included in the table from a first register to a second register that includes the plurality of piecewise analysis coefficients (e.g., the vector of piecewise analysis coefficients) based on the vector of input values. Each input value of the vector of input values may correspond to a set of piecewise analysis coefficients. Further, selecting the plurality of piecewise analysis coefficients may be performed via execution of a single instruction.

Additionally, the processor may determine (e.g., generate) estimated output values of the function based on the plurality of piecewise analysis coefficients and the vector of input values. For example, arithmetic logic circuitry may generate a product by multiplying a first piecewise analysis coefficient with a first input value. The arithmetic logic circuitry may generate a first estimated output value by adding the product and a second piecewise analysis coefficient. In some implementations, determining the estimated output values of the function may be performed by executing another single instruction. In other implementations, selecting the plurality of piecewise analysis coefficients and determining the estimated output values may both be performed in response to the same single instruction.

By using the linear approximation to estimate values of a non-linear function as compared to other approximation techniques, fewer instructions may be used to generate estimated output values of the function. By reducing a number of instructions used to generate the estimated output values as compared to other approximation techniques, a decrease in the amount of computational resources that are used to generate the estimated output values may be achieved. Additionally, by using the permutation network for routing piecewise analysis coefficients, as compared to a per element or per lane lookup table, a decrease in an amount of memory used to store the table, to generate the estimated output values, or both, may be achieved.

Referring to FIG. 1, a system 100 for using piecewise analysis to generate estimated output values of a function corresponding to one or more input values is depicted. According to some implementations, the piecewise analysis may be based on a linear approximation (e.g., $y=a*x+b$) of the function using a first order Taylor expansion. In some implementations, the function may include or correspond to a nonlinear function. For example, the function may include or correspond to an inverse function, a square root function, an inverse square root function, an exponential function, a logarithmic function, a trigonometric function, an inverse trigonometric function (e.g., an arc tangent function), or a combination thereof.

The system 100 includes a processor 102 and a memory 106. The memory 106 may be coupled to the processor 102 and may be configured to store data, such as one or more coefficient tables (e.g., lookup tables). For example, the memory 106 may store an input coefficient table 120. The input coefficient table 120 may include multiple sets of piecewise analysis coefficients associated with a piecewise analysis approximation of a particular function (e.g., an inverse square root function). For example, the input coefficient table 120 may include a first set of piecewise analysis coefficients a0 and b0 and a second set of piecewise analysis coefficients a1 and b1. In other examples, the input coefficient table 120 may include fewer than two or more than two sets of piecewise analysis coefficients. In some implementations, the memory 106 may store multiple input coefficient tables, and each input coefficient table may correspond to a different function, a different degree of estimation accuracy (e.g., a number of segments used in a piecewise analysis), or a combination thereof. Although the memory 106 is illustrated as being distinct from the processor 102 in FIG. 1, in other implementations, the memory 106 may be included in the processor 102.

The processor 102 may be configured to load one or more coefficient tables into one or more registers (e.g., a register file) of the processor 102 in response to receiving a table load instruction. To illustrate, the processor 102 may be configured to retrieve (or receive) the input coefficient table 120 from the memory 106 and to store the input coefficient table 120 in one or more registers of the processor 102.

The processor 102 may be configured to receive one or more vector instructions (not shown in FIG. 1). The one or more vector instructions may include or correspond to vector instructions described with reference to FIGS. 2-7. In some implementations, the processor 102 may load the one or more coefficient tables into the one or more registers prior to receiving the one or more vector instructions. During execution of the one or more vector instructions, the processor 102 may receive an input vector 110 and the input coefficient table 120, and the processor 102 may generate an estimated output values vector 116. The input vector 110 (e.g., a vector of input values) may include or correspond to one or more input values for a particular function. The estimated output values vector 116 may include or correspond to one or more estimated (e.g., approximated) output values of the particular function having input values corresponding to the input vector 110.

The processor 102 may include a coefficient determination unit 104 and arithmetic logic circuitry 112. The coefficient determination unit 104 may be configured to receive (or retrieve) the input vector 110 and the input coefficient table 120 and to select a plurality of coefficients 140. In some implementations, the coefficient determination unit 104 may retrieve (or receive) the input coefficient table 120 from one or more registers of the processor 102. In other implementations, the coefficient determination unit 104 may retrieve (or receive) the input coefficient table 120 from the memory 106. The plurality of coefficients 140 may include or correspond to a coefficient vector, as described with reference to FIGS. 2-5, or one or more selected sets of piecewise analysis coefficients, as described with reference to FIGS. 6 and 7. The plurality of coefficients 140 may include one or more sets of piecewise analysis coefficients. For example, for a particular input value of the input vector 110, the coefficient determination unit 104 of the processor 102 may determine a corresponding plurality of bits (e.g., multiple bits indicating a bit value in binary form). The plurality of bits may be determined based on a number of significant bits associated with a binary representation of the particular input value. The plurality of bits may be used as an index value to perform a lookup to the input coefficient table 120. In other implementations, a single bit value may be determined by the coefficient determination unit 104 and used as an index value to perform the lookup. Based on the lookup, the coefficient determination unit 104 of the processor 102 may determine a particular set of piecewise analysis coefficients corresponding to the particular input value. To illustrate, for each input value of the input vector 110, the coefficient determination unit 104 may select a particular set, such as a pair, of piecewise analysis coefficients from the input coefficient table 120. The plurality of coefficients 140 may include the selected sets of piecewise analysis coefficients. Thus, the plurality of coefficients 140 may include a corresponding set of piecewise analysis coefficients for each input value of (e.g., included in) the input vector 110. For example, each selected set of piecewise analysis coefficients may correspond to an input value of the input vector 110.

In some implementations, the coefficient determination unit 104 may determine bit values corresponding to the input values of the input vector 110 by applying one or more shift values. For example, the coefficient determination unit 104 may perform one or more binary shift operations using the one or more shift values. To illustrate, the coefficient determination unit 104 may right-shift (e.g., divide) an input value. The input value (e.g., a binary representation thereof) may be right-shifted by a shift value (e.g., a number of zeroes) to generate a bit value. A particular number of "most significant" digits of the bit value may be used to generate the index value. In a particular implementation, the input value is normalized prior to receipt by the coefficient determination unit 104, and the input value is right-shifted by a shift value to determine a number (e.g., 2, 3, 4, 5, etc.) of subsequent digits of the bit value that correspond to the index value.

In some implementations, the input coefficient table 120 includes one or more shift values. In a particular implementation, the one or more shift values may have the same value. For example, the same shift value may be applied to each input value of the input vector 110. In other implementations, the processor 102 may receive or generate a vector of shift values. For example, the processor 102 may include a shift value generator, as described with reference to FIG. 9.

In some implementations, the coefficient determination unit 104 may include a permutation network 114. The permutation network 114 may be configured to select and route piecewise analysis coefficients to select the plurality of coefficients 140. For example, the permutation network 114 may select, for each input value of the input vector 110, a particular set (e.g., a pair) of piecewise analysis coefficients from the input coefficient table 120. The permutation network 114 may route the selected sets of piecewise analysis coefficients from a register storing the input coefficient table 120 to another register, thus creating the plurality of coefficients 140. Accordingly, the plurality of coefficients 140 may include a corresponding set of piecewise analysis coefficients for each input value included in the input vector 110. Although the permutation network 114 is illustrated as being included in the coefficient determination unit 104 in FIG. 1, in other implementations, the permutation network 114 may be separate from the coefficient determination unit 104.

In some implementations, the coefficient determination unit 104 may generate a coefficient vector of piecewise analysis coefficients (e.g., a coefficient vector as described with reference to FIGS. 2-5) based on the plurality of coefficients 140. For example, the permutation network 114 may be configured to select and route piecewise analysis coefficients to generate the coefficient vector. To illustrate, the permutation network 114 may select, for each input value of the input vector 110, a corresponding set (e.g., a pair) of piecewise analysis coefficients from the input coefficient table 120. The permutation network 114 may route the selected sets of piecewise analysis coefficients from a register storing the input coefficient table 120 to another register, thus creating the coefficient vector. Accordingly, the coefficient vector may include the plurality of coefficients 140.

The processor 102 may also include the arithmetic logic circuitry 112 configured to perform arithmetic operations. The arithmetic logic circuitry 112 may include one or more adders, subtractors, multipliers, dividers, or a combination thereof. The processor 102 may be configured to perform one or more arithmetic operations on the input vector 110 and the plurality of coefficients 140 using the arithmetic logic circuitry 112. For example, the arithmetic logic circuitry 112 may receive the input vector 110 and the plurality of coefficients 140 and the arithmetic logic circuitry 112 may perform one or more arithmetic operations on the input vector 110 and the plurality of coefficients 140. To illustrate, the arithmetic logic circuitry 112 may perform a multiplication operation to generate a product of a first piecewise analysis coefficient of a set of piecewise analysis coefficients and a corresponding input value. Further, the arithmetic logic circuitry 112 may perform an addition operation to generate a sum of the product of the multiplication operation and a second piecewise analysis coefficient of the set of piecewise analysis coefficients. Thus, for each input value included in the input vector 110, the system 100 may be configured to generate a corresponding estimated output value associated with the particular function. The estimated output values may be stored as the estimated output values vector 116.

In some implementations, the processor 102 (e.g., the coefficient determination unit 104) may be configured to execute a first single instruction (e.g., a vectorized table lookup instruction 201 as described with reference to FIG. 2) to select the plurality of coefficients 140. Further, the processor 102 (e.g., the arithmetic logic circuitry 112) may be configured to execute a second single instruction (e.g., a vector arithmetic instruction 301, as described with reference to FIG. 3) to generate the estimated output values vector 116. In other implementations, the processor 102 may be configured to execute a single instruction (e.g., a single piecewise approximation instruction 601, as described with reference to FIG. 6) to select the plurality of coefficients 140 and the estimated output values vector 116.

In some implementations, the processor 102 may contain one or more registers (not shown) configured to store the various vectors. For example, the processor 102 may include registers configured to store the input vector 110, the input coefficient table 120, the plurality of coefficients 140, and the estimated output values vector 116, or a combination thereof. The registers are described in further detail with reference to FIGS. 3, 4, and 6.

In some implementations, one or more of the input values of the input vector 110 may be normalized to a target range. The target range may include or correspond to a range of nominal values. The target range may be selected to reduce a bit size of values of the multiple sets of piecewise analysis coefficients of the input coefficient table 120. As illustrative, non-limiting examples, the target range may include a range from approximately 0.5 to 1, or from approximately 0 to 1. Applying a shift value to an input value may generate a value within the target range (e.g., a normalized value).

In some implementations, the processor 102 may left-shift (e.g., multiply) a particular input value by a shift value to generate a normalized input value prior to receipt of the input values at the coefficient determination unit 104. The processor 102 (e.g., the coefficient determination unit 104) may right-shift (e.g., divide) the particular input value by a shift value to generate the index value. In some implementations, the coefficient determination unit 104 may receive input values that have not been normalized, and the coefficient determination unit 104 may normalize (e.g., left-shift) the input values prior to right-shifting the input values to generate the index values. In a particular implementation, the one or more of the input values of the input vector 110 may be normalized to the target range prior to generating an index value vector, as described with reference to FIG. 2. A shift value (e.g., a number of zeros) used to generate the normalized value may be the same as or may be different from a shift value used to generate an index value. In other implementations, the coefficient determination unit 104 may left-shift (e.g., multiply) the input values by one or more shift values to determine the bit values.

During operation, the processor 102 may receive the input vector 110. The input vector 110 may be stored in a first register of the processor 102, as described with reference to FIG. 2. The coefficient determination unit 104 and the arithmetic logic circuitry 112 may access the first register to receive (or retrieve) the input vector 110. In some implementations, the input vector 110 may be indicated by an operand of a vector instruction.

The processor 102 may execute a single instruction to generate the plurality of coefficients 140. The coefficient determination unit 104 of the processor 102 may retrieve, receive, or access the input coefficient table 120 to select the plurality of coefficients 140. The input coefficient table 120 may be stored in a second register of the processor 102. In some implementations, for each input value of the input vector 110, the plurality of coefficients 140 may include a corresponding set of piecewise analysis coefficients, as further described with reference to FIG. 2.

The processor 102 may generate the estimated output values vector 116 based on the input vector 110 and the plurality of coefficients 140. To illustrate, the arithmetic logic circuitry 112 may perform vector arithmetic operations on each input value of the input vector 110 and a corresponding set of piecewise analysis coefficients in the plurality of coefficients 140 to generate an estimated output value of the estimated output values vector 116. For example, the arithmetic logic circuitry 112 may multiply an input value of the input vector 110 with a first piecewise analysis coefficient of a corresponding set of piecewise analysis coefficients to generate a product. The arithmetic logic circuitry 112 may add the product and a second piecewise analysis coefficient of the corresponding set of piecewise analysis coefficients to generate an estimated output value of the estimated output values vector 116.

By generating the plurality of coefficients 140 during execution of a single vector instruction, the system 100 may use less memory and power and have increased speed as compared to other systems that select the plurality of coefficients 140 during execution of multiple vector instructions. Additionally, by generating the estimated output values vector 116 during execution of one (or two) vector instruction(s) may further increase speed and further reduce power consumption as compared to other systems that generate the estimated output values vector 116 during execution of more than two vector instructions. Further, performing a vectorized table lookup (e.g., using the permutation network 114 to route piecewise analysis coefficients to select the plurality of coefficients 140) may be less complicated and use less memory and processing resources as compared to other systems that use a per element or per lane lookup table (e.g., a separate lookup table for each input value).

In the aspects of the description described above, various functions performed have been described as being performed by certain circuitry or components of the system 100 of FIG. 1. However, this division of circuitry and components is for illustration only. In alternative examples, a function performed by a particular circuit or component may instead be divided amongst multiple circuits or components. Moreover, in other alternative examples, two or more circuits or components of the system 100 may be integrated into a single circuit or component. Each circuit and component illustrated in FIG. 1 may be implemented using hardware (e.g., an application-specific integrated circuit (ASIC), a processing unit such as a central processing unit (CPU), a digital signal processor (DSP), a controller, another hardware device, a firmware device, or any combination thereof).

Figure 2:
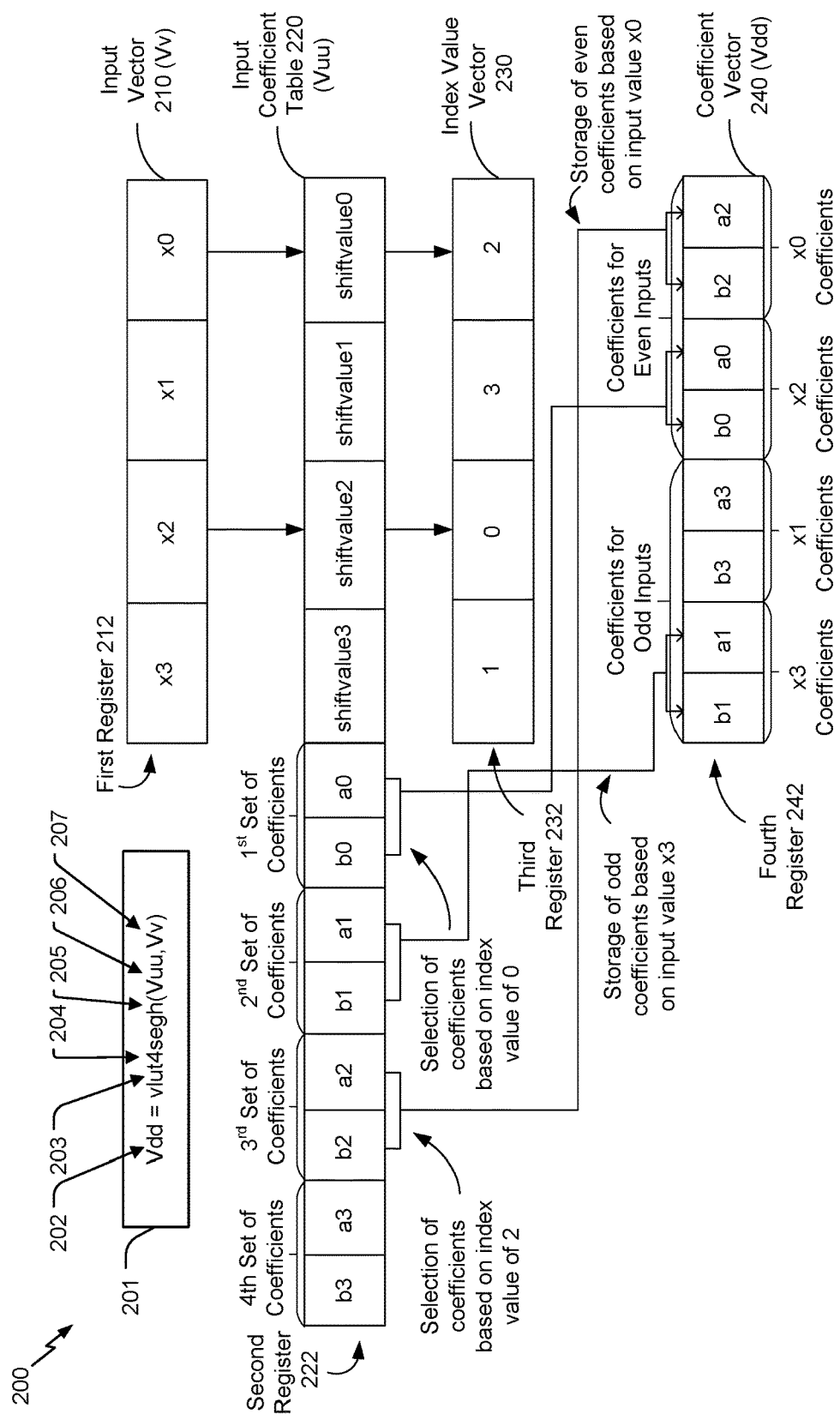
FIG. 2 is a diagram of an illustrative process of executing a vectorized table lookup instruction.

Referring to FIG. 2, a diagram 200 of an illustrative process of executing a vectorized table lookup instruction 201 is disclosed. The vectorized table lookup instruction 201 may be executed by a processor, such as the processor 102 of FIG. 1. As illustrated in FIG. 2, the vectorized table lookup instruction 201 may include an instruction name 203 (vlut4segh) (e.g., an opcode). The instruction name 203 may include a segment indicator 204 and a word length indicator 205. A value of the segment indicator 204 may indicate a number of segments of the piecewise analysis. The value of the segment indicator 204 may also indicate or correspond to a number of sets of piecewise analysis coefficients. In the example illustrated in FIG. 2, the segment indicator 204 indicates that there are four segments of the piecewise analysis (e.g., that there are four sets of piecewise analysis coefficients). A value of the word length indicator 205 may indicate a bit size of the input value. In the example illustrated in FIG. 2, the value of the word length indicator 205 is "h" and may be used to denote the size of the input value is "half" of an instruction word (e.g., 16 bits). In other implementations, the word length indicator 205 may have a different value that indicates a different bit size.

The vectorized table lookup instruction 201 may also include one or more fields (e.g., operands), such as a first field 202 (Vdd), a second field 206 (Vuu), and a third field 207 (Vv). A first value stored in the first field 202 may indicate a coefficient vector 240 (e.g., vector Vdd) for use during execution of a vector arithmetic instruction, as described with reference to FIG. 3. A second value stored in the second field 206 may indicate an input coefficient table 220 (e.g., vector Vuu), and a third value stored in the third field 207 may indicate an input vector 210 (e.g., vector Vv). Although three fields are illustrated, in other implementations the vectorized table lookup instruction 201 may include more than three fields or fewer than three fields.

The processor may be configured to perform various operations during execution of the vectorized table lookup instruction 201. The processor may be configured to receive the input vector 210 (Vv) that includes a plurality of input values, such as x0, x1, x2, and x3. The input vector 210 (e.g., a vector of input values) may be stored in a first register 212 of the processor. The processor may be configured to receive (or retrieve) the input coefficient table 220 from a memory, such as the memory 106 of FIG. 1. The input coefficient table 220 may include multiple sets of piecewise analysis coefficients, such as a0 and b0, a1 and b1, a2 and b2, and a3 and b3. Each set of piecewise analysis coefficients of the multiple sets of piecewise analysis coefficients may correspond to an index value, such as 0, 1, 2, and 3. For example, a0 and b0 may correspond to an index value of 0, and a1 and b1 may correspond to an index value of 1. The input coefficient table 220 may also include one or more shift values, such as shiftvalue0-shiftvalue3. In a particular implementation, the processor may store the input coefficient table 220 in a second register 222 of the processor. In other implementations, the processor may load the input coefficient table 220 into the second register 222 prior to execution of the vectorized table lookup instruction 201. The processor may retrieve (or receive) the input coefficient table 220 from the second register 222 during execution of the vectorized table lookup instruction 201.

In another particular implementation, the input coefficient table 220 may be stored in multiple registers of the processor. For example, the input coefficient table 220 may include a first portion that includes the one or more shift values and a second portion that includes the multiple sets of piecewise analysis coefficients. The first portion of the input coefficient table 220 may be stored in the second register 222 and the second portion of input coefficient table 220 may be stored in another register.

The processor may process the input vector 210 using the input coefficient table 220 to generate an index value vector 230. The index value vector 230 may be stored in a third register 232 of the processor and may include multiple index values, such as 2, 3, 0, and 1. Each index value of the multiple index values may correspond to an input value of input vector 210. FIG. 2 illustrates an example in which no index value is repeated (e.g., appears more than once) in the index value vector 230. In other examples, a particular index value may appear more than once in the index value vector 230. Additionally or alternatively, a possible index value may not appear in the index value vector 230. Each index value of the multiple index values may correspond to a set of piecewise analysis coefficients of the input coefficient table 220. For example, an index value of 0 may correspond to a0 and b0 and an index value of 1 may correspond to a1 and b1.

The multiple index values of the index value vector 230 may be generated based on the input values of input vector 210 and one or more shift values of the input coefficient table 220. For example, the processor may perform one or more binary shift operations on the input values of input vector 210 using the one or more shift values of the input coefficient table 220. To illustrate, the processor may right-shift (e.g., divide) each input value by a corresponding shift value. For example, the processor may right-shift a first input value of the input vector 210 by a first shift value shiftvalue0 of the input coefficient table 220 to generate a first bit value (e.g., a multi-digit bit value). A particular number of significant digits of the first bit value may be used to generate a first index value 2 of the index value vector 230. In some implementations, each of the shift values may have the same value. In other implementations, one or more the shift values may have a different value.

The multiple index values of the index value vector 230 may be used by the processor to generate the coefficient vector 240. The coefficient vector 240 may be stored in a fourth register 242. The processor may use the index value vector 230 as an input for a permutation network, such as the permutation network 114 of FIG. 1, to generate the coefficient vector 240. To illustrate, the permutation network may select and route, based on the index value vector 230, one or more sets of piecewise analysis coefficients from the second register 222 (that includes the input coefficient table 220) to the fourth register 242 to generate the coefficient vector 240. The coefficient vector 240 may be used during the execution of a vector arithmetic instruction, as described with reference to FIG. 3. For example, the permutation network may select a first set of piecewise analysis coefficients a2 and b2 based on the first index value 2 of the index value vector 230. The permutation network may route the first set of piecewise analysis coefficients to the fourth register 242 based on the corresponding input value, the first input value x0. The first set of piecewise analysis coefficients corresponding to the first input value x0 of the input vector 210 may be stored in a first portion of the coefficient vector 240. The first portion of the coefficient vector 240 may correspond to piecewise analysis coefficients for even input values (e.g., x0 and x2).

As another example, the second set of piecewise analysis coefficients a3 and b3 corresponding to the second input value x1 may be stored in the second portion of the coefficient vector 240. The second portion of the coefficient vector 240 may correspond to piecewise analysis coefficients for odd input values (e.g., x1 and x3). In some implementations, the second portion of the coefficient vector 240 may be stored in another register.

During operation, the processor may receive the vectorized table lookup instruction 201. The processor may execute the vectorized table lookup instruction 201 using the input values of the input vector 210 and one or more shift values of the input coefficient table 220 to generate, for each input value, an index value of the index value vector 230. The processor may receive the input vector 210 and store the input vector 210 in the first register 212. In a particular implementation, the input values of the input vector 210 may be normalized to the target range prior to being received by the processor.

The processor may retrieve (or receive) the input coefficient table 220 from the memory. The processor may store the input coefficient table 220 in the second register 222. In some implementations, the processor may load the input coefficient table 220 in the second register 222 prior to executing the vectorized table lookup instruction 201. The processor may load the input coefficient table 220 in the second register 222 in response to receiving a table load instruction. In a particular implementation, the processor 102 may store a first portion of the input coefficient table 220 in the second register 222 and a second portion of the input coefficient table 220 in another register. The processor may apply the one or more shift values to input values of the input vector 210 to generate the index values. As an example, the processor may right-shift (e.g., divide) the input values by a shift value of six (e.g., add six zeroes to a beginning of binary representations of the input values) to generate the index values. The index values may represent a number of significant bits associated with a binary representation of a shifted input value, as described with reference to FIG. 1.

Execution of the vectorized table lookup instruction 201 may also include using the index values of the index value vector 230 to select one or more sets of piecewise analysis coefficients of the input coefficient table 220 to generate the coefficient vector 240. Thus, the processor may select, for each input value, a corresponding set of piecewise analysis coefficients to be included the coefficient vector 240. For example, the permutation network may select, using the index values, one or more sets of piecewise analysis coefficients of the input coefficient table 220 and route the one or more sets of piecewise analysis coefficients from the second register 222 to the fourth register 242 to generate the coefficient vector 240.

The coefficient vector 240 may store the one or more selected sets (e.g., the corresponding sets) of piecewise analysis coefficients using a "crossbar" configuration, as illustrated in FIG. 2. For example, the crossbar configuration may be used to store coefficients corresponding to even input values (e.g., x0, x2, etc.) in a first portion of the coefficient vector (e.g., the fourth register 242 or a first portion of the fourth register 242) and to store coefficients corresponding to odd input values (e.g., x1, x3, etc.) in a second portion of the coefficient vector (e.g., a second portion of the fourth register 242 or another register). By routing and storing the one or more selected sets of piecewise analysis coefficients according to a crossbar configuration (e.g., generating the coefficient vector 240 that includes a crossbar configuration), the permutation network may be able to route and generate the coefficient vector 240 faster than by routing and storing the one or more selected sets of piecewise analysis coefficients according to numerical order. Additionally, by storing data according to a crossbar configuration, the vectorized table lookup instruction 201 may be compatible with (e.g., executable by) conventional permutation networks.

To illustrate, for a first input value x0 of the input vector 210, the permutation network may select a corresponding set of piecewise analysis coefficients based on a first index value of the index value vector 230. For example, the permutation network selects a first set of piecewise analysis coefficients a2 and b2 that correspond to the first index value 2. The permutation network may route a first piecewise analysis coefficient a2 and a second piecewise analysis coefficient b2 of the first set of piecewise analysis coefficients from the second register 222 (that includes input coefficient table 220) to the fourth register 242. The first piecewise analysis coefficient a2 and the second piecewise analysis coefficient b2 of the first set of piecewise analysis coefficients may be stored in the fourth register 242 based on the first input value. For example, because the first input value x0 is an even value, the first piecewise analysis coefficient a2 and the second piecewise analysis coefficient b2 of the first set of piecewise analysis coefficients may be stored in a first half of the fourth register 242. The location in the first half of the fourth register 242 in which the piecewise analysis coefficients are stored may correspond to the position of the corresponding input value in the input vector 210. For example, the first set of piecewise analysis coefficients a2 and b2 may be stored in the first two locations of the first half of the fourth register 242, and piecewise coefficients corresponding to a next even input value (e.g., x2) may be stored in the next two locations in the first half of the fourth register 242. Thus, the permutation network may select (or generate) the first set of piecewise analysis coefficients of the one or more sets of piecewise analysis coefficients to be included the coefficient vector 240.

For a second input value x1 of the input vector 210, the permutation network may select a corresponding set of piecewise analysis coefficients based on a second index value of the index value vector 230. For example, the permutation network selects a second set of piecewise analysis coefficients a3 and b3 that correspond to the second index value 3. The permutation network may route a first piecewise analysis coefficient a3 and a second piecewise analysis coefficient b3 of the second set of piecewise analysis coefficients from the second register 222 (that includes input coefficient table 220) to the fourth register 242. The first piecewise analysis coefficient a3 and the second piecewise analysis coefficient b3 of the second set of piecewise analysis coefficients may be stored in the fourth register 242 based on the second input value. For example, because the second input value x1 is an odd value, the first piecewise analysis coefficient a3 and the second piecewise analysis coefficient b3 of the second set of piecewise analysis coefficients may be stored in a second half of the fourth register 242 (or in another register). The location of the piecewise analysis coefficients in the second half of the fourth register 242 may correspond to the position of the corresponding input value in the input value vector 210, as described above.

To further illustrate, for a third input value x2 of the input vector 210, the permutation network may select a corresponding set of piecewise analysis coefficients based on a third index value of the index value vector 230. For example, the permutation network selects a third set of piecewise analysis coefficients a0 and b0 that correspond to the third index value 0. The permutation network may route a first piecewise analysis coefficient a0 and a second piecewise analysis coefficient b0 of the third set of piecewise analysis coefficients from the second register 222 (that includes input coefficient table 220) to the fourth register 242. The third piecewise analysis coefficient a0 and the second piecewise analysis coefficient b0 of the third set of piecewise analysis coefficients may be stored in the fourth register 242 based on the third input value. For example, because the third input value x2 is an even value, the first piecewise analysis coefficient a0 and the second piecewise analysis coefficient b0 of the third set of piecewise analysis coefficients may be stored in a second location within the first half of the fourth register 242.

For a fourth input value x3 of the input vector 210, the permutation network may select a corresponding set of piecewise analysis coefficients based on a fourth index value of the index value vector 230. For example, the permutation network selects a fourth set of piecewise analysis coefficients a1 and b1 that correspond to the fourth index value 1. The permutation network may route a first piecewise analysis coefficient a1 and a second piecewise analysis coefficient b1 of the fourth set of piecewise analysis coefficients from the second register 222 (that includes input coefficient table 220) to the fourth register 242. The first piecewise analysis coefficient a1 and the second piecewise analysis coefficient b1 of the fourth set of piecewise analysis coefficients may be stored in the fourth register 242 based on the fourth input value. For example, because the fourth input value x3 is an odd value, the first piecewise analysis coefficient a1 and the second piecewise analysis coefficient b1 of the fourth set of piecewise analysis coefficients may be stored in a second location within the second half of the fourth register 242 (or in another register). Thus, the permutation network may generate the coefficient vector 240 by selecting and routing the one or more sets of piecewise analysis coefficients to the fourth register 242 (or to the fourth register 242 and to another register).

The coefficient vector 240 may be used as an input for a vector arithmetic instruction, as described with reference to FIGS. 3 and 5. By generating the coefficient vector 240 during execution of a single instruction, a system may use less memory and power and have increased speed as compared to systems that execute multiple instructions to generate the coefficient vector 240. By using the permutation network to generate the coefficient vector 240, the system may further increase speed and reduce complexity of the system as compared to a per lane or a per element lookup table (e.g., a separate lookup table for each input value).

Figure 3:
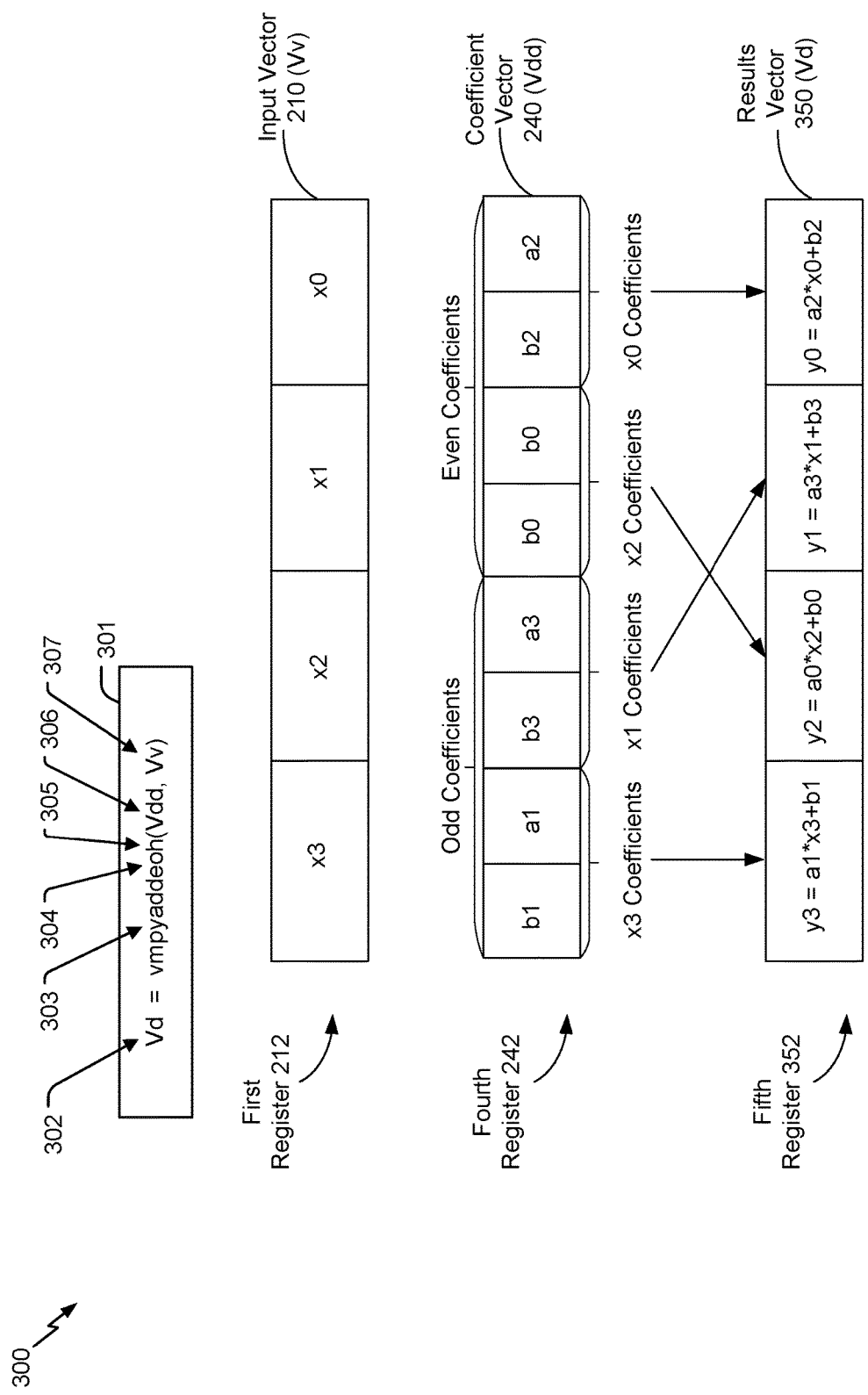
FIG. 3 is a diagram of an illustrative process of executing a vector arithmetic instruction.

Referring to FIG. 3, a diagram 300 of an illustrative process of executing a vector arithmetic instruction 301 is disclosed. The vector arithmetic instruction 301 may be executed by a processor, such as the processor 102 of FIG. 1. As illustrated in FIG. 3, the vector arithmetic instruction 301 may include an instruction name 303 (vmpyaddeoh) (e.g., an opcode). In the particular implementation of FIG. 3, the instruction name indicate a vector multiplication operation (e.g., mpy) and a vector addition operation (e.g., add). The instruction name may indicate an order of the vector operations. For example, "mpy" may indicate multiplying coefficients of (e.g., having) a first type with input values and "add" may indicate adding coefficients of (e.g., having) a second type to a product of the coefficients of a first type with input values. The instruction name 303 may include a configuration indicator 304 and a word length indicator 305. A value of the configuration indicator 304 (eo) may indicate an order of the coefficient vector 240. The value of the configuration indicator 304 (eo) may indicate an even-odd orientation of the coefficient vector 240. For example, the even-odd orientation may include or correspond to a "crossbar" configuration where coefficients corresponding to even input values (e.g., x0, x2, etc.) may be stored in a first portion of the coefficient vector 240 and coefficients corresponding odd input values (e.g., x1, x3, etc.) may be stored in a second portion of the coefficient vector 240. A value of the word length indicator 305 may indicate a bit size of the input values. In the example illustrated in FIG. 2, the value of the word length indicator 305 value is "h" and may be used to denote the size of the input value is "half" of an instruction word (e.g., 16 bits).

The vector arithmetic instruction 301 may also include one or more fields (e.g., operands), such as a first field 302 (Vd), a second field 306 (Vdd), and a third field 307 (Vv). A first value stored in the first field 302 may indicate a results vector 350 (e.g., vector Vd). A second value stored in the second field 306 may indicate the coefficient vector 240 (e.g., vector Vdd), and a third value stored in the third field 307 may indicate the input vector 210 (e.g., vector Vv). Although three fields are illustrated, in other implementations the vector arithmetic instruction 301 may include more than three fields or fewer than three fields.

The processor may be configured to perform various operations during execution of the vector arithmetic instruction 301. As described with reference to FIG. 2, during execution of vectorized table lookup instruction 201, the input vector 210 (Vv) is stored in the first register 212, and the coefficient vector 240 (Vdd) is stored in the fourth register 242. The processor may process the input vector 210 and the coefficient vector 240 and may generate a results vector 350. The results vector 350 may be stored in a fifth register 352. The results vector 350 may include estimated output values of the function. In FIG. 3, the estimated output values include y0-y3. The estimated output values may correspond to approximations of the function based on input values. To illustrate, executing the vector arithmetic instruction 301 may generate a particular estimated output value by performing one or more arithmetic operations on a particular input value of the input vector 210 and a corresponding set of piecewise analysis coefficients of the coefficient vector 240.

In some implementations, the results vector 350 may be generated by arithmetic logic circuitry of the processor, such as the arithmetic logic circuitry 112 of FIG. 1. The arithmetic logic circuitry may be configured to perform arithmetic operations on the input vector 210 and the coefficient vector 240. For example, the arithmetic logic circuitry 112 may multiply input values of the input vector 210 with piecewise analysis coefficients of (e.g., having) a first type of the coefficient vector 240 to generate products. The arithmetic logic circuitry may generate sums based on the products and piecewise analysis coefficients of (e.g., having) a second type of the coefficient vector 240 to generate the estimated output values included in the results vector 350. To illustrate, the arithmetic logic circuitry may multiply a first input value x0 with a first piecewise analysis coefficient a2 of the first type to generate a first product a2*x0. The arithmetic logic circuitry may add the product a2*x0 with a second piecewise analysis coefficient b2 of the second type to generate a first estimated output value, y0=a2*x0+b2. Estimated output values of y1-y3 may be generated in a similar manner.

During operation, the processor may receive the vector arithmetic instruction 301. The processor may execute the vector arithmetic instruction 301 using the input values of the input vector 210 and the piecewise analysis coefficients of the coefficient vector 240 to generate the estimated output values of the results vector 350. The arithmetic logic circuitry of the processor may perform one or more arithmetic operations using the input vector 210 and the coefficient vector 240 to generate the results vector 350. To illustrate, the arithmetic logic circuitry of the processor may, for each input value of the input vector 210, multiply the input value with a first piecewise analysis coefficient of a corresponding set of piecewise analysis coefficients (from the coefficient vector 240) to generate a product. The arithmetic logic circuitry of the processor may generate a sum based on the product and a second piecewise analysis coefficient of the corresponding set of piecewise analysis coefficients. The sum may be stored as an estimated output value of the results vector 350. The estimated output values may represent estimations (or approximations) of the input values of the function. By generating the results vector 350 during execution of a single instruction a system may use less memory and power and have increased speed as compared to systems that execute multiple instructions to generate the results vector 350.

Although multiplication and addition operations have been described, the vector arithmetic instruction 301 is not so limited. For example, the vector arithmetic instruction 301 may indicate one or more arithmetic operations to be performed using the input vector 210 and the coefficient vector 240. The one or more arithmetic operations may include addition operations, subtraction operations, multiplication operations, division operations, or a combination thereof. The one or more arithmetic operations may be indicated by the instruction name 303. In some implementations, the one or more arithmetic operations used to estimate output values of a function may correspond a non-linear approximation (e.g., y(a,x,b)) of the function. As an illustrative, non-limiting example, the non-linear approximation may include dividing coefficients by input values (e.g., a/x).

Figure 4:
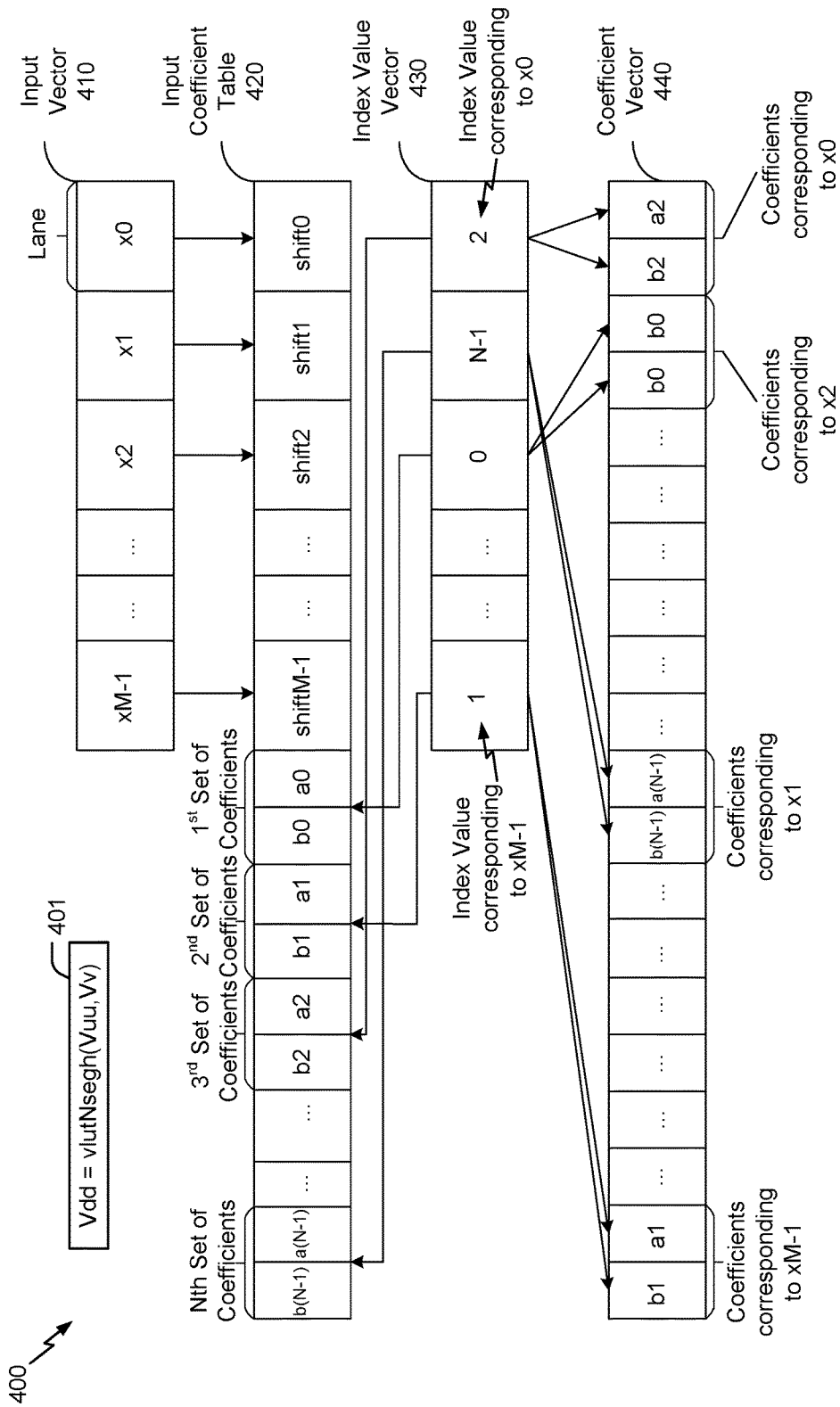
FIG. 4 is a diagram of another illustrative process of executing a vectorized table lookup instruction.

Referring to FIG. 4, a diagram 400 of another illustrative process of executing a vectorized table lookup instruction 401 is disclosed. The vectorized table lookup instruction 401 may be executed by a processor, such as the processor 102 of FIG. 1. As illustrated in FIG. 4, the vectorized table lookup instruction 401 may include an instruction name 203 (vlutNsegh), such as an opcode. The vectorized table lookup instruction 401 may include one or more indicators, one or more fields (e.g., operands), or a combination thereof, as described with reference to FIG. 2. A segment indicator "N" may indicate of number of segments of the piecewise analysis. As illustrative non-limiting examples, N may correspond to a value of 2, 4, 8, 16, 32, etc.

The processor may be configured to perform various operations during execution of the vectorized table lookup instruction 401. The processor may receive an input vector 410. The input vector 410 may include a number M of input values. In a particular implementation, M is 64. In other implementations, M may be fewer than 64 or greater than 64. The processor (or a coefficient determination unit) may retrieve (or receive) an input coefficient table 420. The input coefficient table 420 may include multiple shift values. A number of shift values included in the input coefficient table 420 may be the same as the number of input values (e.g., M). The input coefficient table 420 may also include multiple sets of piecewise analysis coefficients. A number of sets of piecewise analysis coefficients may be the same as the number of segments of the piecewise analysis (e.g., N). The processor may generate the index value vector 430 in the manner described with reference to FIG. 2. The index value vector 430 may include multiple index values. A number of index values included in the input coefficient table 420 may be the same as the number of input values (e.g., M).

The processor may generate the coefficient vector 440 in this manner described with reference to FIG. 2. The coefficient vector 440 may include multiple sets of piecewise analysis coefficients. A number of sets of piecewise analysis coefficients included in the coefficient vector 440 may be the same as the number of input values (e.g., M). The sets of piecewise analysis coefficients may be stored in the coefficient vector 440 in a crossbar configuration, as described with reference to FIG. 2. For example, coefficients corresponding to even input values (e.g., x0, x2, . . . , xM−2) may be stored in a first portion of the coefficient vector 440 and coefficients corresponding to odd input values (e.g., x1, x3, . . . , xM−1) may be stored in a second portion of the coefficient vector 440. Additionally, the input coefficient table 420 and the coefficient vector 440 may include twice as many bits as the input vector 410, the index value vector 430, or both. For example, two coefficients may be selected for each input value, hence the coefficient vector 440 may store twice as many elements as the input vector 410.

In some implementations, registers of the processor may be a particular size (e.g., may be configured to store a first number of bits). The input vector 410, the index value vector 430, or both may be the particular size. The input coefficient table 420 and the coefficient vector 440 may be larger than the particular size. In some implementations, the input coefficient table 420 and the coefficient vector 440 may be twice as large as the registers. For example, the registers may store 1024 bits, and the input coefficient table 420 and the coefficient vector 440 may be 2048 bits. Thus, the input coefficient table 420 and the coefficient vector 440 may each be stored in multiple registers, such as two registers. For example, a first portion of the coefficient vector 440 that include sets of piecewise analysis coefficients corresponding to even input values (e.g., x0, x2, etc.) may be stored in a first register and a second portion of the coefficient vector 440 that includes sets of piecewise analysis coefficients corresponding to odd input values (e.g., x1, x3, etc.) may be stored in a second register.

During operation, the processor may receive the vectorized table lookup instruction 401. The processor may execute the vectorized table lookup instruction 401 using the input values of the input vector 410 and one or more shift values of the input coefficient table 420 to generate, for each input value, an index value of the index value vector 430. The index values may represent a number of significant bits associated with a binary representation of a shifted input value, as described with reference to FIGS. 1 and 2.

Execution of the vectorized table lookup instruction 401 may also include using the index values of the index value vector 430 and one or more sets of piecewise analysis coefficients of the input coefficient table 420 to generate (or select), for each input value, a corresponding set of piecewise analysis coefficients of the coefficient vector 440. To illustrate, for a first input value x0 of the input vector 410, the permutation network may select a corresponding set of piecewise analysis coefficients a2 and b2 based on a first index value 2 of the index value vector 430. The coefficient vector 440 may store the one or more sets (e.g., the corresponding sets) of piecewise analysis coefficients using the crossbar configuration, as described with reference to FIG. 2.

The coefficient vector 440 may be used as an input for a vector arithmetic instruction, as described with reference to FIGS. 3 and 5. By generating the coefficient vector 440 during execution of a single instruction, a system may use less memory and power and have increased speed as compared to systems that execute multiple instructions to generate the coefficient vector 440. By using the permutation network to generate the coefficient vector 440 the system may further use less memory and have increased speed as compared to a per lane or a per element lookup table (e.g., a separate lookup table for each input value).

Figure 5:
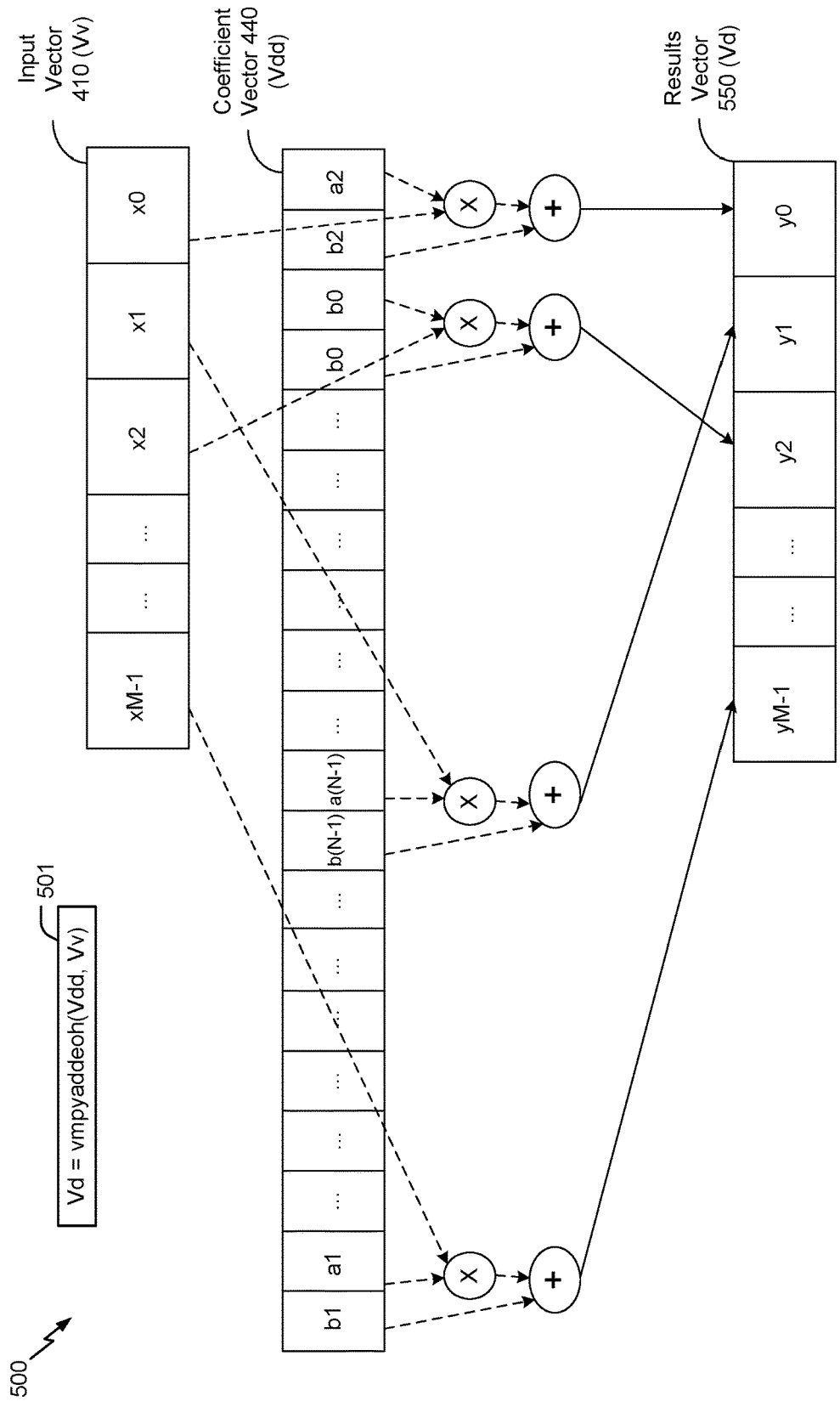
FIG. 5 is a diagram of another illustrative process of executing a vector arithmetic instruction.

Referring to FIG. 5, a diagram 500 of another illustrative process of executing a vector arithmetic instruction 501 is disclosed. The vector arithmetic instruction 501 may be executed by a processor, such as the processor 102 of FIG. 1. As illustrated in FIG. 5, the vector arithmetic instruction 501 may include an instruction name (vmpyaddeoh), such as an opcode. The vector arithmetic instruction 501 may include one or more indicators, one or more fields (e.g., operands), or a combination thereof, as described with reference to FIG. 3.

The processor may be configured to perform various operations during execution of the vector arithmetic instruction 501. As described with reference to FIG. 4, during execution of vectorized table lookup instruction 401 the input vector 410 (Vv) is received and the coefficient vector 440 (Vdd) is generated. During execution of the vector arithmetic instruction 501, the processor may process the input vector 410 and the coefficient vector 440 and may generate a results vector 550. The results vector 550 may include multiple estimated output values of the function. A number of estimated output values of the function may be the same as the number of input values of the input vector 410 (e.g., the input vector 410 and the results vector 550 may include M elements).

During operation, the processor may receive the vector arithmetic instruction 501. The processor may execute the vector arithmetic instruction 501 using the input values of the input vector 410 and the piecewise analysis coefficients of the coefficient vector 440 to generate the estimated output values of the results vector 550, as described with reference to FIG. 3. To illustrate, the arithmetic logic circuitry may multiply a first input value x0 with a first piecewise analysis coefficient a2 of the first type to generate a first product a2*x0. The arithmetic logic circuitry may add the product a2*x0 with a second piecewise analysis coefficient b2 of the second type to generate a first estimated output value, y0=a2*x0+b2. Estimated output values of y1-yM−1 may be generated in a similar manner. By generating the results vector 550 during execution of a single instruction, a system may use less memory and power and have increased speed as compared to systems that execute multiple instructions to generate the results vector 550.

Figure 6:
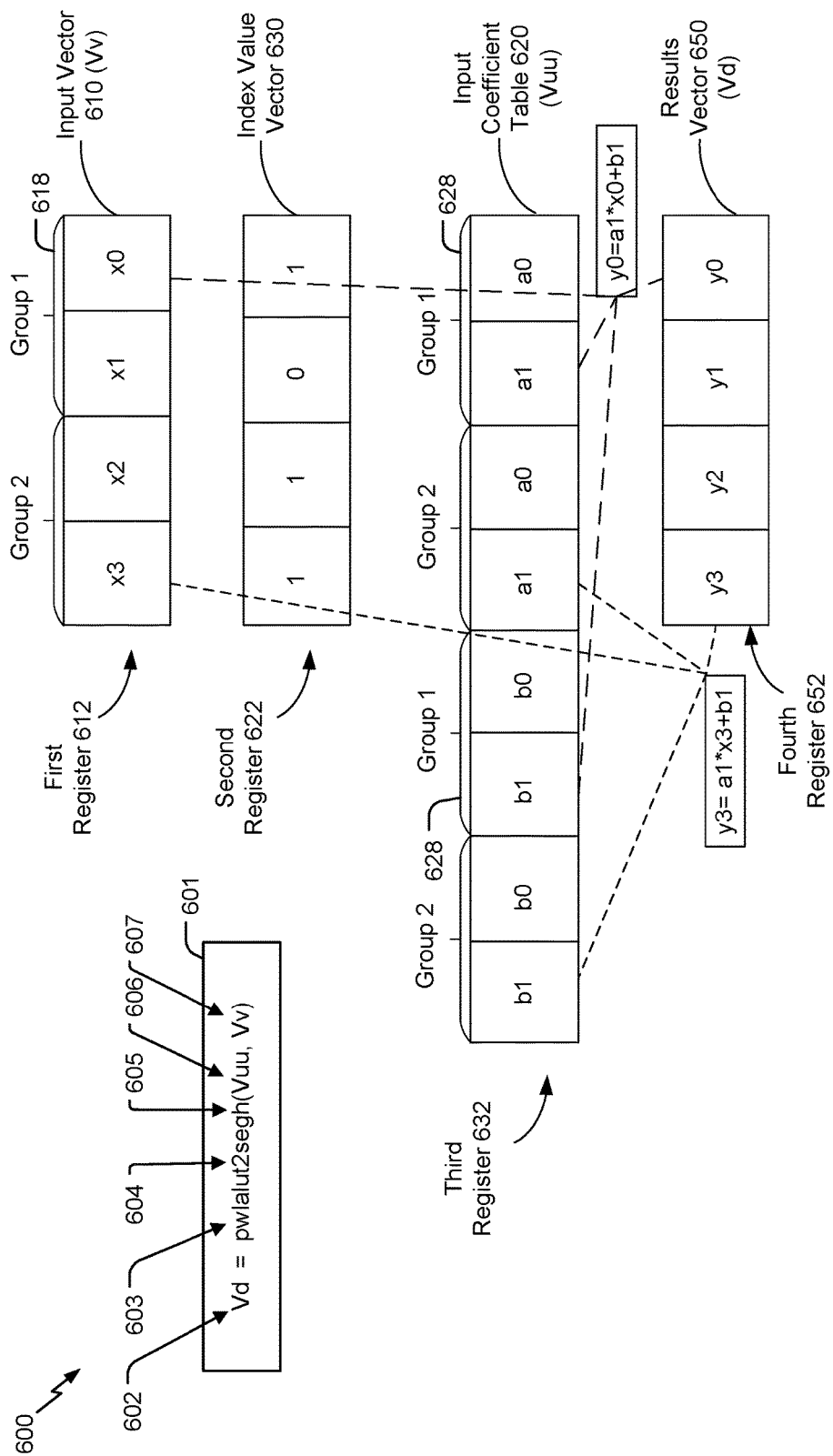
FIG. 6 is a diagram of an illustrative process of executing a single piecewise approximation instruction.

Referring to FIG. 6, a diagram 600 of a particular illustrative process of executing a single piecewise approximation instruction 601 is disclosed. The single piecewise approximation instruction 601 may be a single vector instruction. The single piecewise approximation instruction 601 may be executed by a processor, such as the processor 102 of FIG. 1.

As illustrated in FIG. 6, the single piecewise approximation instruction 601 may include an instruction name 603 (pwlalut2segh) (e.g., an opcode). The instruction name 603 may include one or more indicators, such a segment indicator 604 and a word length indicator 605. A value of the segment indicator 604 may indicate a number of segments of the piecewise analysis. The value of the segment indicator 604 may also indicate or correspond to a number of piecewise analysis coefficients that make up a group of piecewise analysis coefficients in an input coefficient table 620. The piecewise analysis coefficients (e.g., the group of piecewise analysis coefficients) may be repeated one or more times in the input coefficient table 620. In the example illustrated in FIG. 6, the segment indicator indicates that there are two segments of the piecewise analysis (e.g., that there are two sets of piecewise analysis coefficients (or four piecewise analysis coefficients) in a group). By having repeated groups of piecewise analysis coefficients, vector operations may be performed in a single instruction (or with a single operation) when a number of input values is greater than the number of segments indicated by the segment indicator 604. Vector operations may be performed in a single instruction because a number of sets of piecewise analysis coefficients may match a number of input values. For example, as illustrated in FIG. 6, an input vector 610 includes four input values (x0-x3) and the segment indicator indicates a two segment piecewise approximation (two sets of piecewise analysis coefficients a0-a1, b0-b1). Thus, by having a second group (group 2), a number of sets of piecewise analysis coefficients (e.g., 4 (a0-a1, b0-b1 of group 1 and a0-a1, b0-b1 of group 2)) may match a number of input vales (e.g., 4). Accordingly, the single piecewise approximation instruction 601 may receive larger input vectors without increasing the complexity of the piecewise approximation.

A value of the word length indicator 605 may indicate a bit size of the input value. In the example illustrated in FIG. 6, the value of the word length indicator 605 is "h" and may be used to denote the size of the input value is "half" of an instruction word (e.g., 16 bits). Although the input coefficient table 620 is illustrated as having two groups, the input coefficient table 620 may include more groups or fewer groups. A number of groups of the input coefficient table 620 may be based on the segment indicator 604, a number of input values of an input vector 610, a word length of the input values, or a combination thereof.

The single piecewise approximation instruction 601 may also include one or more fields (e.g., operands), such as a first field 602 (Vd), a second field 606 (Vuu), and a third field 607 (Vv). A first value stored in the first field 602 may indicate a results vector 650 (e.g., vector Vd). A second value stored in the second field 606 may indicate the input coefficient table 620 (e.g., vector Vuu), and a third value stored in the third field 607 may indicate the input vector 610 (e.g., vector Vv). Although three fields are illustrated, in other implementations the single piecewise approximation instruction 601 may include more than three fields or fewer than three fields.

The processor may be configured to perform various operations during execution of the single piecewise approximation instruction 601. The processor may be configured to receive an input vector 610 (Vv) that includes a plurality of input values, such as x0, x1, x2, and x3. The input vector 610 (e.g., a vector of input values) may be stored in a first register 612 of the processor. The plurality of input values of the input vector 610 may be organized into groups. For example, x0 and x1 may be part of a first group of input values 618 (e.g., Group 1) and x2 and x3 may be part of a second group of input values (e.g., Group 2). The groups may correspond to groups of piecewise analysis coefficients in the input coefficient table 620. For example, the first group of input values 618 (e.g., Group 1) may correspond to a first group of piecewise analysis coefficients 628 (e.g., Group 1) in the input coefficient table 620.

The processor may process the input vector 610 using one or more shift values to generate an index value vector 630. In some implementations, a single shift value may be used. For example, a single shift value (e.g., five zeroes) may be applied to each input value of the input vector 610, or a vector of shift values having a same value may be applied to the input values of the input vector 610. In other implementations, different shift values may be used. As an illustrative, non-limiting example, a first shift value (e.g., three zeroes) may be applied to a first input value, and a second shift value (e.g., six zeros) may be applied to a second input value. The one or more shift values may be fixed (e.g., stored or predetermined). The one or more shift values may be generated by the processor or stored in a memory and accessed by the processor. In a particular implementation, the one or more shift values may be generated by a shift value generator, as described with reference to FIG. 9. The one or more shift values may be used by the processor to normalize the input values of the input vector 610 to a target range. The index value vector 630 may be stored in a second register 622 of the processor and may include multiple index values. Each index value of the multiple index values may correspond to an input value of input vector 610. FIG. 6 illustrates an example in which index values may be repeated (e.g., appears more than once) in each group of the index value vector 630. In other examples, a particular index value may appear once in each group of the index value vector 630. Additionally or alternatively, a possible index value may not appear in one or more groups of the index value vector 630.

The processor may be configured to receive (or retrieve) an input coefficient table 620 from a memory, such as the memory 106 of FIG. 1. The processor may be configured to store the input coefficient table 620 in a third register 632. The input coefficient table 620 may include multiple sets of piecewise analysis coefficients, such as a first set (a0 and b0) and a second set (a1 and b1). The multiple sets of piecewise analysis coefficients of the input coefficient table 620 may be repeated. For example, the input coefficient table 620 may include multiple groups of piecewise analysis coefficients. Each group of piecewise analysis coefficients may include a piecewise analysis coefficient from each set of the multiple sets of piecewise analysis coefficients. To illustrate in FIG. 6, the first group of piecewise analysis coefficients 628 includes a0 and a1 and the second group includes a0 and a1. In other implementations, the processor may load the input coefficient table 620 from the memory into the third register 632 prior to execution of the single piecewise approximation instruction 601. The processor may retrieve (or receive) the input coefficient table 620 from the third register 632 during execution of the single piecewise approximation instruction 601.

In another particular implementation, the input coefficient table 620 may be stored in multiple registers of the processor. For example, the input coefficient table 620 may include a first section (or portion) that includes multiple piecewise analysis coefficients of a first type (a) and a second section (or portion) that includes multiple piecewise analysis coefficients of a second type (b). The first section of the input coefficient table 620 may be stored in the third register 632 and the second section of input coefficient table 620 may be stored in another register. Each section of the input coefficient table 620 may include a group of piecewise analysis coefficients (or a portion thereof) that corresponds to the groups of the input vector. For example, the first section and the second section of the input coefficient table 620 may each include a portion of the first group of piecewise analysis coefficients 628 (e.g., Group 1) that corresponds to the first group of input values 618 (e.g., Group 1). The first section and the second section of the input coefficient table 620 may also each include a portion of a second group piecewise analysis coefficients (e.g., Group 2) that corresponds to the second group of input values (e.g., Group 2).

The multiple index values of the index value vector 630 may be used by the processor to generate a results vector 650. The results vector 650 may be stored in a fourth register 642. The processor may use the index value vector 630 as an input for a permutation network, such as the permutation network 114 of FIG. 1, to generate the results vector 650. To illustrate, the permutation network may select and route, based on the index value vector 630, one or more sets of piecewise analysis coefficients from the third register 632 (that includes the input coefficient table 620) to arithmetic logic circuitry. The one or more selected sets of piecewise analysis coefficients may include or correspond to the plurality of coefficients 140 of FIG. 1, and the arithmetic logic circuitry may include or correspond to the arithmetic logic circuitry 112 of FIG. 1. The arithmetic logic circuitry may be configured to perform arithmetic operations on the input vector 610 and the selected sets of piecewise analysis coefficients from the input coefficient table 620 to generate the results vector 650. The results vector 650 may include estimated output values of the function. In FIG. 6, the estimated output values include y0-y3. The estimated output values may correspond to approximations of the function based on the input values.

During operation, the processor may receive the single piecewise approximation instruction 601. The processor may execute the single piecewise approximation instruction 601 using the input values of the input vector 610 and one or more shift values to generate, for each input value, an index value of the index value vector 630.

The processor (or a coefficient determination unit) may apply the one or more shift values to input values of the input vector 610 to generate the index values. As an example, the processor may right-shift the input values to generate the index values. The index values may represent a particular number of significant bits associated with a binary representation of a shifted input value, as described with reference to FIG. 1. In a particular implementation, the input values of the input vector 610 may be normalized to the target range prior to being received by the processor.

The processor (or the coefficient determination unit) may retrieve (or receive) the input coefficient table 620 from the memory, and the processor may store the input coefficient table 620 in the third register 632. In a particular implementation, the processor may store a first section of the input coefficient table 620 in the third register 632 and a second section of the input coefficient table 620 in another register. In some implementations, the processor may load the input coefficient table 620 in the third register 632 prior to executing the single piecewise approximation instruction 601. The processor may load the input coefficient table 620 in the third register 632 in response to receiving a table load instruction.

Execution of the single piecewise approximation instruction 601 may also include using the index values of the index value vector 630 and one or more sets of piecewise analysis coefficients of the input coefficient table 620 to select, for each input value, a corresponding set of piecewise analysis coefficients of the coefficient vector 640. In some implementations, a permutation network may select, using the index values, one or more sets of piecewise analysis coefficients of the input coefficient table 220 and route the one or more sets of piecewise analysis coefficients from the third register 632 to arithmetic logic circuitry of the processor. The permutation network may include or correspond to the permutation network 114 of FIG. 1.

The arithmetic logic circuitry may multiply input values of the input vector 610 with piecewise analysis coefficients of a first type (a) to generate products. The arithmetic logic circuitry may generate sums based on the products (a*x) and piecewise analysis coefficients having a second type (b) to generate the estimated output values for the results vector 650. To illustrate, the arithmetic logic circuitry may multiply a first input value x0 of the first group of input values 618 and a first piecewise analysis coefficient a1 of the first group of piecewise analysis coefficients 628 to generate a first product a1*x0. The arithmetic logic circuitry may add the product a1*x0 with a second piecewise analysis coefficient b1 of the first group of piecewise analysis coefficients 628 to generate a first estimated output value y0=a1*x0+b1.

As another illustration, the arithmetic logic circuitry may multiply a second input value x3 of a second group of input values and a third piecewise analysis coefficient a1 of a second group of piecewise analysis coefficients to generate a second product a1*x3. The arithmetic logic circuitry may add the second product a1*x3 with a fourth piecewise analysis coefficient b1 of the second group of piecewise analysis coefficients to generate a second estimated output value y3=a1*x3+b1. The third piecewise analysis coefficient a1 may have the same value as the first piecewise analysis coefficient a1, but the third piecewise analysis coefficient a1 may be selected from a different group (e.g., Group 2). Estimated output values of y1 and y2 may be generated in a similar manner. By generating the results vector 650 during execution of a single instruction, a system may use less memory and power and have increased speed as compared to systems that execute multiple instructions to generate the results vector 650.

Figure 7:
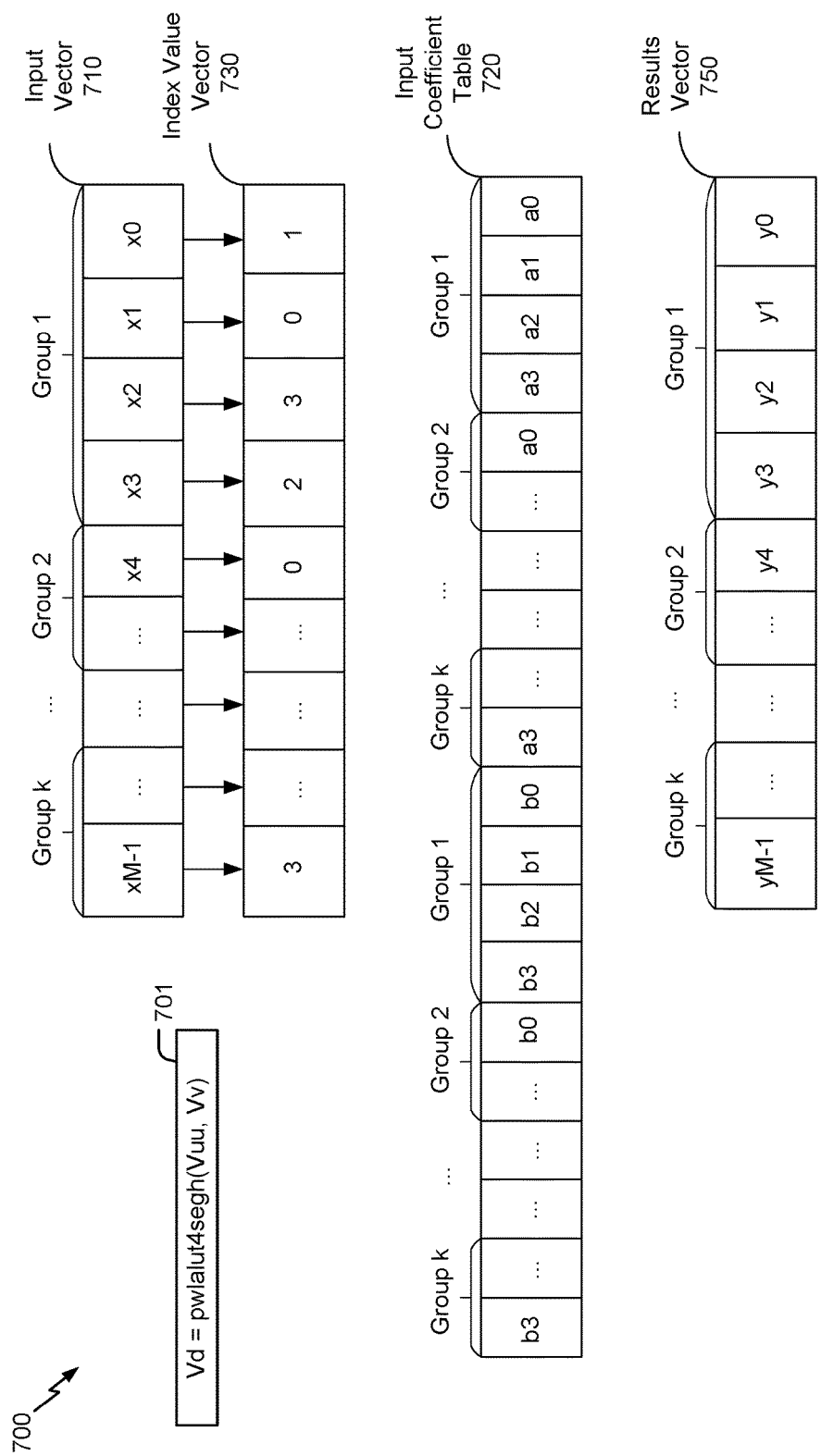
FIG. 7 is a diagram of another illustrative process of executing a single piecewise approximation instruction.

Referring to FIG. 7, a diagram 700 of another illustrative process of executing a single piecewise approximation instruction 701 is disclosed. The single piecewise approximation instruction 701 may be a single vector instruction. As illustrated in FIG. 7, the single piecewise approximation instruction 701 may include an instruction name (pwlalut4segh), such as an opcode. The single piecewise approximation instruction 701 may include one or more indicators, one or more fields (e.g., operands), or a combination thereof, as described with reference to FIG. 6. In the example illustrated in FIG. 7, the single piecewise approximation instruction 701 corresponds to a four segment piecewise analysis. A number of Groups (k) may correspond to a number of segments, a number of input values (M) of an input vector 710, a number of bits of the input values, or a combination thereof. As an illustrative, non-limiting example, k may have a value of 16. In other examples, a value of k may be less than or greater than 16. By having repeated sets of piecewise analysis coefficients (e.g., the groups), vector operations may be performed in a single instruction (or with a single operation) when a number of input values is greater than a number of segments of the piecewise approximation, such as four segments (a0-a3, b0-b3) as illustrated in FIG. 7. Vector operations may be performed in a single instruction because a number of sets of piecewise analysis coefficients may match a number of input values. For example, as FIG. 7 illustrates a four segment operation, if there are sixty-four input values, then there may be 16 groups of piecewise analysis coefficients (of four sets of piecewise analysis coefficients each) to match the sixty-four input values. Thus, the single piecewise approximation instruction 701 may receive larger input vectors without increasing the complexity of the piecewise approximation.

The single piecewise approximation instruction 701 may be executed by a processor, such as the processor 102 of FIG. 1. The processor may receive the input vector 710 that includes a plurality of input values. The processor may process the plurality of input values and concurrently generate multiple estimated output values (e.g., contents) of a results vector 750, as described with reference to FIG. 6.

During operation, the processor may receive the single piecewise approximation instruction 701. The processor may execute the single piecewise approximation instruction 701 using the input values of the input vector 710 and one or more shift values to generate, for each input value, an index value of an index value vector 730. The processor may retrieve or receive an input coefficient table 720. The processor may determine or select a plurality of coefficients from the input coefficient table 720, as described with reference to FIG. 6. FIG. 7 illustrates an example in which no index value is repeated (e.g., appears more than once) in each group the index value vector 730. In other examples, a particular index value may appear more than once in each group of the index value vector 730. Additionally or alternatively, a possible index value may not appear in one or more groups the index value vector 730.

The processor may generate the results vector 750 using the input values of the input vector 710 and the plurality of coefficients, as described with reference to FIG. 6. To illustrate, the arithmetic logic circuitry may multiply a first input value x0 with a first piecewise analysis coefficient a1 of a first group of piecewise analysis coefficients of the input coefficient table 720 to generate a first product a1*x0. The arithmetic logic circuitry may add the product a1*x0 with a second piecewise analysis coefficient b1 of a second group of piecewise analysis coefficients of the input coefficient table 720 to generate a first estimated output value y0=a1*x0+b1. Estimated output values of y1-yM−1 may be generated in a similar manner. By generating the results vector 750 during execution of a single instruction, a system may use less memory and power and have increased speed as compared to systems that execute multiple instructions to generate the results vector 750.

Figure 8:
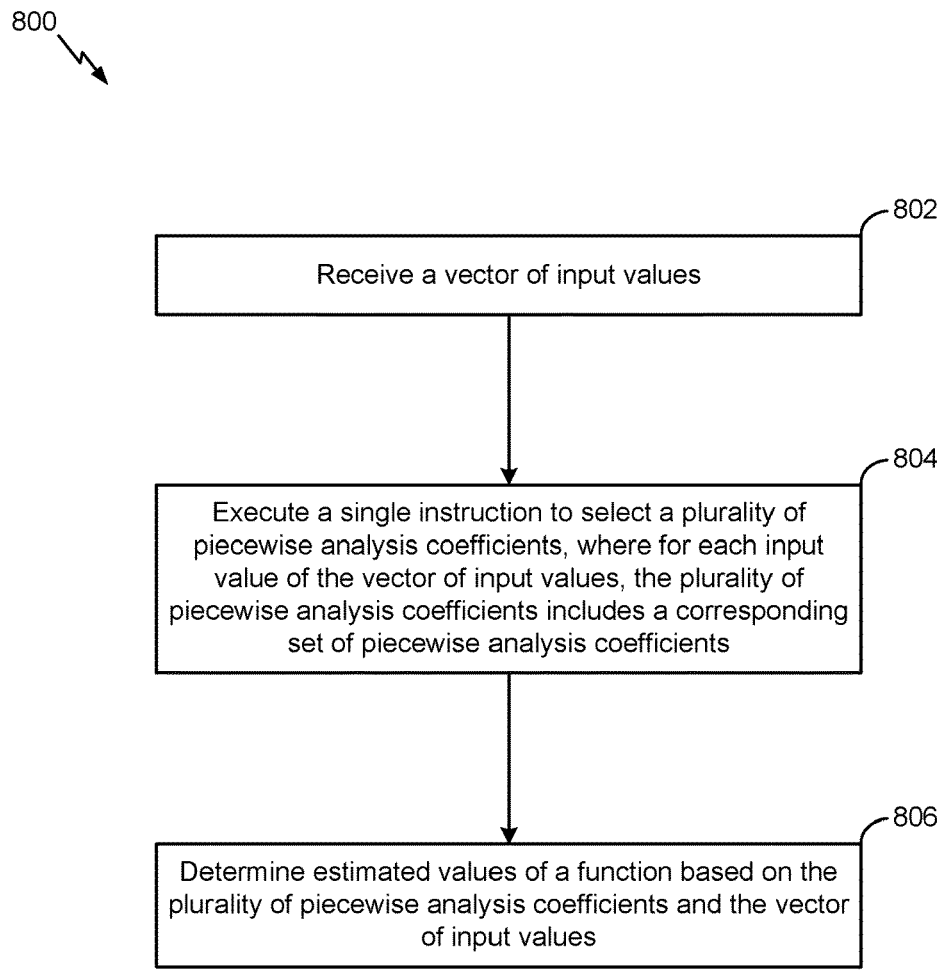
FIG. 8 is a flow chart illustrating an example of a method of generating estimated values of a function.

Referring to FIG. 8, a flow chart of a particular illustrative example of a method of generating estimated values is disclosed and generally designated 800. The method 800 may be performed by a processor, such as the processor 102 of FIG. 1. The method 800 includes receiving a vector of input values, at 802. For example, the vector of input values may include or correspond to the input vector 110 of FIG. 1, the input vector 210 of FIGS. 2 and 3, the input vector 410 of FIGS. 4 and 5, the input vector 610 of FIG. 6, or the input vector 710 of FIG. 7. In some implementations, the vector of input values may correspond to input values of a function. To illustrate, the coefficient determination unit 104 of the processor 102 may receive the input vector 110, as described with reference to FIG. 1.

The method 800 also includes executing a single instruction to select a plurality of piecewise analysis coefficients, at 804. For example, the single instruction to select the plurality of piecewise analysis coefficients may include or correspond to the vectorized table lookup instruction 201 of FIG. 2, the vectorized table lookup instruction 401 of FIG. 1, the single piecewise approximation instruction 601 of FIG. 6, or the single piecewise linear approximation instruction of FIG. 7. The plurality of piecewise analysis coefficients may include or correspond to plurality of piecewise analysis coefficients of FIG. 1, the coefficient vector 240 of FIGS. 2 and 3, the coefficient vector 340 of FIGS. 4 and 5, or the one or more selected sets plurality of piecewise analysis coefficients of FIGS. 6 and 7. The plurality of piecewise analysis coefficients may include one or more sets of piecewise analysis coefficients, and each set of piecewise analysis coefficients may correspond to an input value of the vector of input values. To illustrate, the permutation network 114 of the coefficient determination unit 104 may select the plurality of coefficients 140, as described with reference to FIG. 1.

The method 800 further includes determining estimated output values of a function based on the vector of piecewise analysis coefficients and the vector of input values, at 806. The estimated output values of a function may include or correspond to the estimated output values vector 116 of FIG. 1, the results vector 350 of FIG. 3, the results vector 550 of FIG. 5, the results vector 650 of FIG. 6, or the results vector 750 of FIG. 7. To illustrate, the arithmetic logic circuitry 112 of the processor 102 may determine the estimated output values vector 116, as described with reference to FIG. 1.

In some implementations, the method 800 may include generating a vector of piecewise analysis coefficients that includes the plurality of piecewise analysis coefficients. For example, the permutation network 114 of the processor 102 of FIG. 1 may generate the coefficient vector 240 of FIGS. 2 and 3, or the coefficient vector 440 of FIGS. 4 and 5. In a particular implementation, generating the vector of piecewise analysis coefficients may include, for each input value of the vector of input values, selecting a set of piecewise analysis coefficients from a table based on the input value. The table may include or correspond to the input coefficient table 120 of FIG. 1, the input coefficient table 220 of FIGS. 2 and 3, the input coefficient table 420 of FIGS. 4 and 5, the input coefficient table 620 of FIG. 6, or the input coefficient table 720 of FIG. 7. The table may include multiple sets of piecewise analysis coefficients. By using a permutation network the method 800 may use less memory and have increased speed as compared to systems that use a per lane or per element lookup table (e.g., a separate lookup table for each input value) to select coefficients used to approximate the function.

In some implementations, executing the single instruction further includes determining the estimated output values of the function. For example, executing the single piecewise approximation instruction 601 of FIG. 6 or the single piecewise approximation instruction 701 of FIG. 7 may determine the results vector 650 or the results vector 750, respectively. The results vector 650 and the results vector 750 may include multiple estimated output values. By using a linear approximation (e.g., a first order Taylor expansion) and a vectorized table lookup, execution of the single instruction may determine the estimated output values. By determining the estimated output values with a single instruction, a processor may use less resources and processing cycles than a processor that uses non-linear approximation, a per element lookup, a per lane lookup, or a combination thereof.

In some implementations, executing the single instruction to select the plurality of piecewise analysis coefficients may include performing a lookup to a table of piecewise analysis coefficients based on a plurality of bits corresponding to a first input value of vector of input values. Executing the single instruction to select the plurality of piecewise analysis coefficients may also include determining, based on the lookup, a first set of piecewise analysis coefficients corresponding to the first input value. For example, executing the vectorized table lookup instruction 201 may include the processor performing a lookup to the input coefficient table 220 based on a plurality of bits (e.g., a multi-digit bit value) corresponding to the first input value x0 of the input vector 210 and determining the first set of piecewise analysis coefficients a2 and b2 corresponding to the first input value x0, as described with reference to FIG. 2.

In some implementations, executing the single instruction to select the plurality of piecewise analysis coefficients may include generating the plurality of bits based on the first input value and a shift value. For example, the plurality of bits (e.g., the bit value) may be generated based on the first input value x0 and the first shift value shiftvalue0, as described with reference to FIG. 2.

In some implementations, the method 800 may include selecting the table of piecewise analysis coefficients from a plurality of tables based on the function. For example, the processor 102 may retrieve the input coefficient table 120 from one or more registers of the processor 102. The processor 102 may receive (or retrieve) the input coefficient table 120 prior to receiving the input vector 110, as described with reference to FIG. 1.

In some implementations, each set of the multiple sets of piecewise analysis coefficients includes at least one coefficient of a first type and at least one coefficient of a second type. For example, with reference to FIG. 1, each set of piecewise analysis coefficients includes at least one "a" coefficient and at least one "b" coefficient. In some implementations, the table includes a first portion that includes the multiple sets of piecewise analysis coefficients and a second portion that includes one or more shift values, as described with reference to FIGS. 2-5. In other implementations, the table includes a first section that includes multiple piecewise analysis coefficients of the first type and a second section that includes multiple piecewise analysis coefficients of the second type, as described with reference to FIGS. 6 and 7.

In some implementations, the table may include multiple groups of piecewise analysis coefficients. For example, the input coefficient table 620 of FIG. 6 and the input coefficient table 720 of FIG. 7 may include multiple groups, such as Group 1 and Group 2. The piecewise analysis coefficients of at least two groups of the multiple groups of piecewise analysis coefficients may be the same. For example, Group 1 and Group 2 of the first section of the input coefficient table 620 of FIG. 6 each may include a0 and a1.

In some implementations, the plurality of piecewise analysis coefficients may include multiple sets of piecewise analysis coefficients, and each set of piecewise analysis coefficients in the multiple sets of piecewise analysis coefficients may include two piecewise analysis coefficients. For example, the coefficient vector 240 of FIG. 2 may include multiple sets of piecewise analysis coefficients, such as the first set a0 and b0 and the second set a1 and b1, selected by a permutation network. In a particular implementation, each set of the multiple sets of piecewise analysis coefficients may include at least one coefficient of a first type and at least one coefficient of a second type. For example, the first type may include or correspond to "a" type coefficients and the second type may include or correspond to "b" type coefficients. In some implementations, the plurality of piecewise analysis coefficients may correspond to linear analysis coefficients.

In some implementations, the function may include a nonlinear function. For example, the function may include an inverse function, a square root function, an exponential function, a logarithmic function, an arc tangent function, or a combination thereof, as described with reference to FIG. 1.

In some implementations, the estimated output values may be determined by executing a second single instruction. For example, the second single instruction may include or correspond to the vector arithmetic instruction 301 of FIG. 3 or the vector arithmetic instruction 501 of FIG. 5. Executing the second single instruction may include generating a product of a first piecewise analysis coefficient of the plurality of piecewise analysis coefficients and a first input value of the vector of input values. Executing the second single instruction may also include generating a first estimated output value based on a sum of the product and a second piecewise analysis coefficient of the plurality of piecewise analysis coefficients.

In some implementations, the method 800 may include calculating a shift value based on the vector of input values and a target range. For example, the processor of FIG. 1 or a shift value generator 990 of FIG. 9 may calculate a shift value. The method 800 may also include for each input value of the vector of input values, generating a plurality of bits based on the input value and the shift value. A number of significant bits of the plurality of bits may be within the target range. In other implementations, a single bit may be generated.

The method 800 may thus enable the processor to generate estimated output values of a function using a reduced number of instructions. For example, the processor may execute one or two instructions to generate the estimated output values. The reduced number of instructions may use less processing resources. By using less processing resources, the method 800 may use less memory and power and have increased speed.

In particular aspects, the method 800 of FIG. 8 may be implemented by a field-programmable gate array (FPGA) device, (e.g., an ASIC, a DSP, a controller, a FPGA device, etc.), software (e.g., instructions executable by a processor, etc.), or any combination thereof. As an example, the method 800 of FIG. 8 may be performed by a processor that executes instructions, as described with respect to FIG. 9. To illustrate, a portion of the method 800 of FIG. 8 may be combined with a second portion of the method 800 of FIG. 8. Additionally, one or more operations described with reference to the FIG. 8, may be optional, may be performed at least partially concurrently, may be performed in a different order than shown or described, or a combination thereof.

Figure 9:
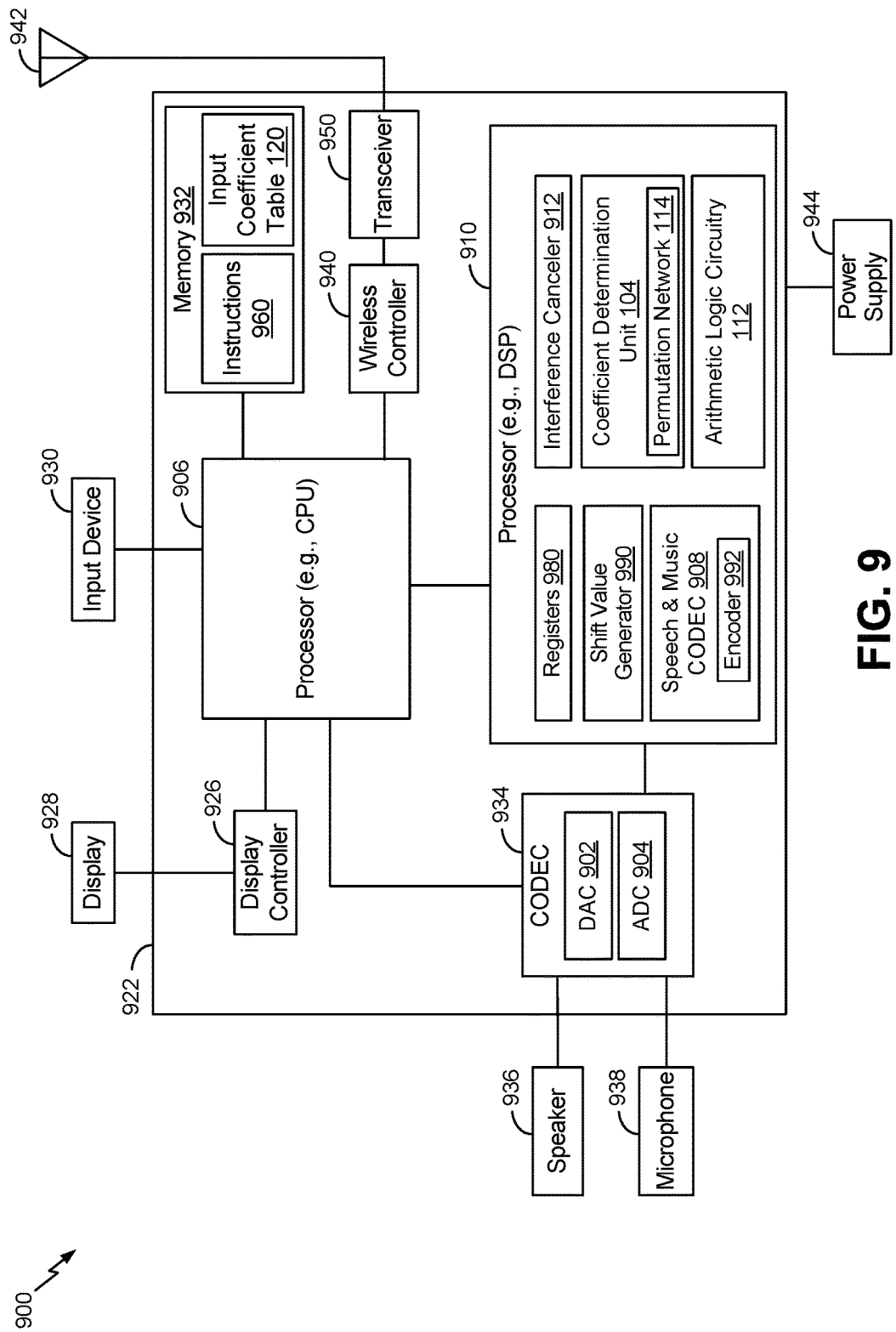
FIG. 9 is a block diagram of a particular illustrative example of a device that is operable to generate estimated values of a function.

Referring to FIG. 9, a block diagram of a particular illustrative example of a device (e.g., a wireless communication device) is depicted and generally designated 900. In various implementations, the device 900 may have more or fewer components than illustrated in FIG. 9. In an illustrative example, the device 900 may operate according to the method 800 of FIG. 8.

In a particular implementation, the device 900 includes a processor 906 (e.g., a CPU) and a memory 932. The device 900 may include one or more additional processors, such as a processor 910 (e.g., a DSP). The processor 906, the processor 910, or both, may include or correspond to the processor 102 of FIG. 1, and the memory 932 may include or correspond to the memory 106 of FIG. 1. The processor 910 may include registers 980 and a shift value generator 990. The registers 980 may include or correspond to the registers as described with reference to FIGS. 1-7. The shift value generator 990 may be configured to generate (or calculate) one or more shift values. The shift value generator 990 may generate (or calculate) the shift values based on a range of input values and a target range for the input values. The one or more shift values may be applied to input values to generate index values, as described with reference to FIGS. 1 and 2. Additionally or alternatively, the one or more shift values may be used to normalize the input values to the target range.

The processor 910 may include the coefficient determination unit 104, the arithmetic logic circuitry 112, and the permutation network 114 of FIG. 1. Although the registers 980 are illustrated as a component of the processor 910, in other examples one or more components of the registers 980 may be included in the processor 906, a coder-decoder (CODEC) 934, another processing component, or a combination thereof. Additionally, the coefficient determination unit 104, the arithmetic logic circuitry 112, and the permutation network 114 of FIG. 1 may be included in the processor 906, a CODEC 934, another processing component, or a combination thereof.

The processor 910 may include a speech and music CODEC 908 and an interference canceller 912. The speech and music CODEC 908 may include an encoder 992, such as a vocoder encoder. Although the speech and music CODEC 908 is illustrated as a component of the processor 910, in other examples one or more components of the speech and music CODEC 908 may be included in the processor 906, the CODEC 934, another processing component, or a combination thereof.

The device 900 may include the memory 932 and the CODEC 934. The CODEC 934 may include a digital-to-analog converter (DAC) 902 and an analog-to-digital converter (ADC) 904. A speaker 936, a microphone 938, or both may be coupled to the CODEC 934. The CODEC 934 may receive analog signals from the microphone 938, convert the analog signals to digital signals using the analog-to-digital converter 904, and provide the digital signals to the speech and music CODEC 908. The speech and music CODEC 908 may process the digital signals. In some implementations, the speech and music CODEC 908 may provide digital signals to the CODEC 934. The CODEC 934 may convert the digital signals to analog signals using the digital-to-analog converter 902 and may provide the analog signals to the speaker 936.

The device 900 may include a wireless controller 940 coupled, via a transceiver 950 (e.g., a transmitter, a receiver, or a combination thereof), to an antenna 942. The device 900 may include the memory 932, such as a computer-readable medium or a computer-readable storage device. The memory 932 may include instructions 960, such as one or more instructions that are executable by the processor 906, the processor 910, or a combination thereof, to perform the method 800 of FIG. 8.

As an illustrative example, the memory 932 may store at least a single instruction that, when executed by the processor 906, the processor 910, or a combination thereof, cause the processor 906, the processor 910, or a combination thereof, to select a plurality of piecewise analysis coefficients based on a vector of input values. The plurality of piecewise analysis coefficients may include one or more sets of piecewise analysis coefficients, and each set of piecewise analysis coefficients may correspond to an input value of the vector of input values. The at least a single instruction, when executed, may further cause the processor 906, the processor 910, or a combination thereof, to generate a vector of piecewise analysis coefficients based on the selected plurality of piecewise analysis coefficients. For example, the processor 906, the processor 910, or a combination thereof, may cause the permutation network to route the selected plurality of piecewise analysis coefficients to one or more registers to generate the vector of piecewise analysis coefficients.

In some implementations, the at least a single instruction, when executed, may further cause the processor 906, the processor 910, or a combination thereof, to determine estimated output values of a function based on the vector of piecewise analysis coefficients and the vector of input values. In other implementations, the at least a single instruction includes a second instruction that when executed, may further cause the processor 906, the processor 910, or a combination thereof, to determine estimated output values of a function based on the vector of piecewise analysis coefficients and the vector of input values.

In some implementations, the at least a single instruction, when executed, may further cause the processor to generate a plurality of bits based on a first input value of the vector of input values and a shift value, to perform a lookup to a coefficient table based on the plurality of bits, and to determine, based on the lookup, a first set of piecewise analysis coefficients corresponding to the first input value.

In some implementations, the memory 932 may include code (e.g., interpreted or compiled program instructions) that may be executed by the processor 906, the processor 910, or both, to cause the processor 906, the processor 910, or both, to perform functions as described with reference to the processor 102 of FIG. 1, to perform at least a portion of the method 800 of FIG. 8, or a combination thereof. To further illustrate, Examples 1-3 depict illustrative instructions and illustrative pseudo-code (e.g., simplified C-code) that may be compiled and stored in the memory 932. The pseudo-code illustrates a possible implementation of aspects described with respect to FIGS. 1-8. The pseudo-code includes comments which are not part of the executable code. In the pseudo-code, a beginning of a comment is indicated by a forward slash and asterisk (e.g., "/*") and an end of the comment is indicated by an asterisk and a forward slash (e.g., "*/"). To illustrate, a comment "COMMENT" may appear in the pseudo-code as /* COMMENT */.

In the provided examples, the "==" operator indicates an equality comparison, such that "A==B" has a value of TRUE when the value of A is equal to the value of B and has a value of FALSE otherwise. The "&&" operator indicates a logical AND operation. The "||" operator indicates a logical OR operation. The ">" (greater than) operator represents "greater than", the ">=" operator represents "greater than or equal to", and the "<" operator indicates "less than".

In the provided example, "*" may represent a multiplication operation, "+" or "sum" may represent an addition operation, "−" may indicate a subtraction operation, and "/" may represent a division operation. The "=" operator represents an assignment (e.g., "a=1" assigns the value of 1 to the variable "a"). The ">>" may represent a right-shift operation. Other implementations may include one or more conditions in addition to or in place of the set of conditions of Examples 1-3.

Example 1

```
Vdd=vlut32segh(Vuu,Vv)
/ *Vv Contains 64 16s value x63, . . . , x3, x2, x1, x0, Vuu.H contains 32x (b,a)
segments and Vuu.L contains splatted 16s Shift value* /
    for (i = 0; i < 1024/32; i++) {
        Vdd.V16s[2*i] = Vuu.V16s[64+Vv.V16s[2*i]>>Vuu.V16s[2*i] modulo
        2^5] ;
        Vdd.V16s[2*i+1] = Vuu.V16s[64+Vv.V16s[2*i]>>Vuu.V16s[2*i] modulo
        2^5 +1 ] ;
        Vdd.V16s[64+2*i] = Vuu.V16s[64+Vv.V16s[2*i+1]>>Vuu.V16s[2*i+1]
        modulo 2^5] ;
        Vdd.V16s[64+2*i+1] = Vuu.V16s[64+Vv.V16s[2*i+1]>>Vuu.V16s[2*i+1]
        modulo 2^5 +1 ] ;
    };
```

Example 2

```
Vd=vmpyaddeoh(Vdd,Vv)
/ *Vv Contains 64 16s value x63, . . . , x3, x2, x1, x0, Vdd.L contains (b,a) pairs for
even elements and Vdd.H contains (b,a) pairs for odd elements* /
    for (i = 0; i < 1024/32; i++) {
        Vd.V16s[2*i]=sat_16(Vdd.V16s[2*i+1]+(((Vdd.V16s[2*i] *
        Vv.V16s[2*i])+0x4000)>>15)) ;
        Vd.V16s[2*i+1]=sat_16(Vdd.V16s[64+2*i+1]+(((Vdd.V16s[64+2*i] *
        Vv.V16s[2*i+1])+0x4000)>>15)) ;
    };
```

Example 3

```
Vd=pwlalut4segh(Vuu,Vv)
/ * Vv Contains x3, x2, x2, x0, Vuu.L contains a3, a2, a1, a0, Vuu.H contains b3, b2,
b1, b0* /
    for (i = 0; i < 1024/16; i++) {
        Vd.V16s[i]=sat_16(Vuu.V16s[Vv.V16s[i]>>12&3+((64+i)>>2)<<2]+(((Vu
        u.V16s[Vv.V16s[i]>>12&3+(i>>2)<<2] * Vv.V16s[i])+0x4000)>>15));
    };
```

The memory 932 may include instructions 960 executable by the processor 906, the processor 910, the CODEC 834, another processing unit of the device 900, or a combination thereof, to perform methods and processes disclosed herein, such as the method 800 of FIG. 8. One or more components of the system 100 of FIG. 1 may be implemented via dedicated hardware (e.g., circuitry), by a processor executing instructions (e.g., the instructions 960) to perform one or more tasks, or a combination thereof. As an example, the memory 932 or one or more components of the processor 906, the processor 910, the CODEC 934, or a combination thereof, may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 960) that, when executed by a computer (e.g., a processor in the CODEC 934, the processor 906, the processor 910, or a combination thereof), may cause the computer to perform at least a portion of the method 800 of FIG. 8. As an example, the memory 932 or the one or more components of the processor 906, the processor 910, the CODEC 934 may be a non-transitory computer-readable medium that includes instructions (e.g., the instructions 960) that, when executed by a computer (e.g., a processor in the CODEC 934, the processor 906, the processor 910, or a combination thereof), cause the computer perform at least a portion of the method 800 of FIG. 8.

In a particular implementation, the device 900 may be included in a system-in-package or system-on-chip device 922. In some implementations, the memory 932, the processor 906, the processor 910, the display controller 926, the CODEC 934, the wireless controller 940, and the transceiver 950 are included in a system-in-package or system-on-chip device 922. In some implementations, an input device 930 and a power supply 944 are coupled to the system-on-chip device 922. Moreover, in a particular implementation, as illustrated in FIG. 9, the display 928, the input device 930, the speaker 936, the microphone 938, the antenna 942, and the power supply 944 are external to the system-on-chip device 922. In other implementations, each of the display 928, the input device 930, the speaker 936, the microphone 938, the antenna 942, and the power supply 944 may be coupled to a component of the system-on-chip device 922, such as an interface or a controller of the system-on-chip device 922. In an illustrative example, the device 900 corresponds to a communication device, a mobile communication device, a smartphone, a cellular phone, a laptop computer, a computer, a tablet computer, a personal digital assistant, a set top box, a display device, a television, a gaming console, a music player, a radio, a digital video player, a digital video disc (DVD) player, an optical disc player, a tuner, a camera, a navigation device, a decoder system, an encoder system, or any combination thereof.

In an illustrative example, the processor 910 may be operable to perform all or a portion of the methods or operations described with reference to FIGS. 1-8. For example, the processor 910 may receive a vector of input values. The input values may include or correspond to samples of a signal received by the antenna 942. The coefficient determination unit 104 may retrieve an input coefficient table. The processor 910 may execute a single instruction to select a plurality of piecewise analysis coefficients from the input coefficient table. In some implementations, the permutation network 114 may generate a coefficient vector that includes the plurality of piecewise analysis coefficients. The arithmetic logic circuitry 112 may generate a results vector including estimated output values.

In conjunction with the described aspects, an apparatus may include means for receiving a vector of input values. For example, the means for receiving the vector of input values may include or correspond to the processor 102, the memory 106, the coefficient determination unit 104, the permutation network 114, the arithmetic logic circuitry 112 of FIG. 1, the first register 212 of FIG. 2, the first register 412 of FIG. 4, the first register 612 of FIG. 6, the first register 712 of FIG. 7, the transceiver 950, the wireless controller 940, the registers 980, one or more of the processors 906, 910 programmed to execute the instructions 960 of FIG. 9, one or more other structures, devices, circuits, modules, or instructions to receive a vector of input values, or a combination thereof.

The apparatus may also include means for executing a single instruction to select a plurality of piecewise analysis coefficients. For example, the means for executing may include or correspond to the processor 102, the coefficient determination unit 104, the permutation network 114 of FIG. 1, one or more of the processor 910, 906 programmed to execute the instructions 960 of FIG. 9, one or more other structures, devices, circuits, modules, or instructions to execute a single instructions to select a plurality of piecewise analysis coefficients, or a combination thereof. The plurality of piecewise analysis coefficients may include one or more sets of piecewise analysis coefficients, and each set of piecewise analysis coefficients may correspond to an input value of the vector of input values.

The apparatus may further include means for determining estimated output values of a function based on the plurality of piecewise analysis coefficients and the vector of input values. For example, the means for determining may include or correspond to the processor 102, the arithmetic logic circuitry 112 of FIG. 1, one or more of the processor 910, 906 programmed to execute the instructions 960 of FIG. 9, one or more other structures, devices, circuits, modules, or instructions to determine estimated output values of a function, or a combination thereof.

The apparatus may also include means for storing a vector of piecewise analysis coefficients. For example, the means for storing the vector of piecewise analysis coefficients may include or correspond to the processor 102, the memory 106, the coefficient determination unit 104, the permutation network 114, the arithmetic logic circuitry 112 of FIG. 1, the fourth register 242 of FIG. 2, the fourth register 442 of FIG. 4, the registers 980, one or more of the processor 910, 906 programmed to execute the instructions 960 of FIG. 9, one or more other structures, devices, circuits, modules, or instructions to store a vector of piecewise analysis coefficients, or a combination thereof. The vector of piecewise analysis coefficients may include the plurality of piecewise analysis coefficients.

In some implementations, the means for receiving, the means for executing, and the means for determining are integrated into a mobile phone, a cellular phone, a computer, a portable computer, a tuner, a radio, a satellite radio, a communication device, a modem, a portable music player, a portable digital video player, a navigation device, a personal digital assistant (PDA), a mobile location data unit, or a combination thereof.

In the aspects of the description described above, various functions performed have been described as being performed by certain circuitry or components, such as circuitry or components of the system 100 of FIG. 1, the device 900 of FIG. 9, or a combination thereof. However, this division of circuitry and components is for illustration only. In alternative examples, a function performed by a particular circuit or component may instead be divided amongst multiple circuits or components. Moreover, in other alternative examples, two or more circuits or components of FIGS. 1-7 and 9 may be integrated into a single circuit or component. Each circuit and component illustrated in FIGS. 1-7 and 9 may be implemented using hardware (e.g., an ASIC, a DSP, a controller, a FPGA device, etc.), software (e.g., logic, modules, instructions executable by a processor, etc.), or any combination thereof.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the aspects disclosed herein may be included directly in hardware, in a software module executed by a processor, or in a combination of the two. A software module may reside in RAM, flash memory, ROM, PROM, EPROM, EEPROM, registers, hard disk, a removable disk, a CD-ROM, or any other form of non-transient storage medium known in the art. A particular storage medium may be coupled to the processor such that the processor may read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein and is to be accorded the widest scope possible consistent with the principles and novel features as defined by the following claims.

What is claimed is:

1. An apparatus comprising:
   one or more registers configured to store a vector that includes a plurality of input values;
   a coefficient determiner communicatively coupled to the one or more registers and configured to, responsive to execution by a processor of a single instruction, select a plurality of piecewise analysis coefficients based on a table storing a plurality of sets of piecewise analysis coefficients, the plurality of piecewise analysis coefficients corresponding to one or more of the plurality of sets of piecewise analysis coefficients, and each set of piecewise analysis coefficients corresponding to a respective one of the plurality of input values; and arithmetic logic circuitry coupled to the coefficient determiner and configured to, responsive to execution of at least the single instruction, determine estimated output values of a function based on the plurality of piecewise analysis coefficients, a shift operation of at least one of the plurality of input values, and the vector.

2. The apparatus of claim 1, further comprising a permutation network configured to, responsive to execution of the single instruction, generate a vector of piecewise analysis coefficients that includes the plurality of piecewise analysis coefficients.

3. The apparatus of claim 1, wherein the coefficient determiner is further configured to retrieve the table from a memory, wherein the function includes a nonlinear function, and wherein the input values correspond to input values of the nonlinear function.

4. The apparatus of claim 1, wherein the table includes a first portion that includes multiple sets of piecewise analysis coefficients and a second portion that includes one or more shift values.

5. The apparatus of claim 1, wherein each set of the multiple sets of piecewise analysis coefficients includes at least one coefficient of a first type and at least one coefficient of a second type.

6. The apparatus of claim 1, wherein the table includes a first section that includes multiple piecewise analysis coefficients of a first type and a second section that includes multiple piecewise analysis coefficients of a second type.

7. The apparatus of claim 1, further comprising a permutation network configured to select the plurality of piecewise analysis coefficients.

8. The apparatus of claim 1, wherein the arithmetic logic circuitry is further configured to multiply a particular input value of the vector with a first piecewise analysis coefficient of a particular set of piecewise analysis coefficients of the one or more sets of piecewise analysis coefficients to generate a product.

9. The apparatus of claim 8, wherein the arithmetic logic circuitry is further configured to generate a sum based on the product and a second piecewise analysis coefficient of the particular set of piecewise analysis coefficients, and wherein the sum corresponds to a first estimated output value of the estimated output values.

10. The apparatus of claim 1, wherein the one or more registers include:
a first register configured to store the vector;
a second register configured to store multiple sets of piecewise analysis coefficients; and
a third register configured to store an index value vector, the index value vector generated based on the vector and one or more shift values.

11. The apparatus of claim 1, wherein the one or more registers include a register configured to store a vector of piecewise analysis coefficients that includes the plurality of piecewise analysis coefficients and another register configured to store the estimated output values, and further comprising a permutation network configured to route, based on an index value vector, one or more sets of piecewise analysis coefficients to the register to generate the vector of piecewise analysis coefficients.

12. A method of estimating values, the method comprising:
receiving a vector of input values;
executing, at a processor of an electronic device, a single instruction to select a plurality of piecewise analysis coefficients, the plurality of piecewise analysis coefficients corresponding to one or more sets of piecewise analysis coefficients, each set of piecewise analysis coefficients corresponding to an input value of the vector of input values; and
determining, at the electronic device, estimated output values of a function based on the plurality of piecewise analysis coefficients, a shift operation of at least one of the input values, and the vector of input values.

13. The method of claim 12, further comprising determining a shift value and generating a vector of piecewise analysis coefficients that includes the plurality of piecewise analysis coefficients based on the shift value, wherein generating the vector of piecewise analysis coefficients comprises, for each input value of the vector of input values, selecting a set of piecewise analysis coefficients from a table based on the input value, and wherein the table includes multiple sets of piecewise analysis coefficients.

14. The method of claim 12, wherein executing the single instruction comprises:
performing a lookup to a table of piecewise analysis coefficients based on a plurality of bits corresponding to an input value of the vector of input values; and
determining, based on the lookup, a first set of piecewise analysis coefficients corresponding to the input value.

15. The method of claim 12, wherein executing the single instruction further comprises generating a plurality of bits based on one of the input values and based on a shift value.

16. The method of claim 12, further comprising selecting a table from a plurality of tables based on the function.

17. The method of claim 12, further comprising performing a lookup to a table of piecewise analysis coefficients, wherein the table includes multiple groups of piecewise analysis coefficients, and wherein piecewise analysis coefficients of at least two groups of the multiple groups of piecewise analysis coefficients are the same.

18. The method of claim 12, wherein:
one or more of the input values is associated with a shift value, and
the plurality of piecewise analysis coefficients corresponds to linear analysis coefficients.

19. The method of claim 12, wherein the plurality of piecewise analysis coefficients includes multiple sets of piecewise analysis coefficients, and wherein each set of piecewise analysis coefficients in the multiple sets of piecewise analysis coefficients includes two piecewise analysis coefficients.

20. The method of claim 12, wherein the function includes a nonlinear function, and wherein the vector of input values corresponds to input values of the nonlinear function.

21. The method of claim 12, wherein the estimated output values are determined by executing a second single instruction, and wherein executing the second single instruction comprises:
generating a product of a first piecewise analysis coefficient of the plurality of piecewise analysis coefficients and an input value of the vector of input values; and
generating a first estimated output value based on a sum of the product and a second piecewise analysis coefficient of the plurality of piecewise analysis coefficients.

22. The method of claim 12, wherein executing the single instruction further includes determining the estimated output values.

23. The method of claim 12, further comprising:
calculating a shift value based on the vector of input values and a target range; and
for each input value of the vector of input values, generating a plurality of bits based on the input value and the shift value, wherein a number of significant bits of the plurality of bits are within the target range.

24. An apparatus comprising:
means for receiving a vector of input values;
means for executing a single instruction to select a plurality of piecewise analysis coefficients, the plurality of piecewise analysis coefficients comprising one or more sets of piecewise analysis coefficients, each set of piecewise analysis coefficients corresponding to an input value of the vector, and the means for executing configured to shift at least one of the input values; and means for determining estimated output values of a function based on the plurality of piecewise analysis coefficients and the vector.

25. The apparatus of claim 24, further comprising means for storing a vector of piecewise analysis coefficients that includes the plurality of piecewise analysis coefficients.

26. The apparatus of claim 24, wherein the means for receiving, the means for executing, and the means for determining are integrated into a mobile phone, a cellular phone, a computer, a portable computer, a tuner, a radio, a satellite radio, a communication device, a modem, a portable music player, a portable digital video player, a navigation device, a personal digital assistant (PDA), a mobile location data unit, or a combination thereof.

27. A storage medium comprising at least a single instruction that, when executed by a processor at a device, causes the processor to initiate or perform operations comprising:
selecting a plurality of piecewise analysis coefficients based on a corresponding plurality of input values of a vector in a data structure, the plurality of piecewise analysis coefficients comprising one or more sets of piecewise analysis coefficients, each set of piecewise analysis coefficients corresponding to an input value of the vector, the device configured to shift at least one of the input values; and generating, at the electronic device, a vector of piecewise analysis coefficients based on the plurality of piecewise analysis coefficients.

28. The storage medium of claim 27, wherein the at least a single instruction, when executed by the processor, causes the processor to receive, from a table associated with the data structure into one or more registers of the processor, the vector of piecewise analysis coefficients.

29. The storage medium of claim 27, wherein the at least a single instruction includes a second instruction that, when executed by the processor, causes the processor to determine estimated output values of a function based on the vector of piecewise analysis coefficients and the vector.

30. The storage medium of claim 27, wherein the at least a single instruction, when executed by the processor, further causes the processor to:
generate a plurality of bits based on an input value of the vector and a shift value;
perform a lookup to a coefficient table based on the plurality of bits; and
determine, based on the lookup, a first set of piecewise analysis coefficients corresponding to the input value.

* * * * *